US011423287B2

(12) United States Patent
Lorrain et al.

(10) Patent No.: US 11,423,287 B2
(45) Date of Patent: Aug. 23, 2022

(54) COMPUTER FOR SPIKING NEURAL NETWORK WITH MAXIMUM AGGREGATION

(71) Applicant: COMMISSARIAT A L'ENERGIE ATOMIQUE ET AUX ENERGIES ALTERNATIVES, Paris (FR)

(72) Inventors: Vincent Lorrain, Palaiseau (FR); Olivier Bichler, Vieille Eglise en Yvelines (FR)

(73) Assignee: COMMISSARIAT A L'ENERGIE ATOMIQUE ET AUX ENERGIES ALTERNATIVES, Paris (FR)

(*) Notice: Subject to any disclaimer, the term of this patent is extended or adjusted under 35 U.S.C. 154(b) by 432 days.

(21) Appl. No.: 16/634,141

(22) PCT Filed: Jul. 11, 2018

(86) PCT No.: PCT/EP2018/068853
§ 371 (c)(1),
(2) Date: Jan. 25, 2020

(87) PCT Pub. No.: WO2019/020384
PCT Pub. Date: Jan. 31, 2019

(65) Prior Publication Data
US 2020/0210807 A1 Jul. 2, 2020

(30) Foreign Application Priority Data
Jul. 25, 2017 (FR) ...................................... 1757052

(51) Int. Cl.
*G06N 3/04* (2006.01)
*G06N 3/08* (2006.01)
*G06F 9/30* (2018.01)

(52) U.S. Cl.
CPC ............... *G06N 3/049* (2013.01); *G06N 3/08* (2013.01); *G06F 9/30036* (2013.01)

(58) Field of Classification Search
CPC .......... G06N 3/049; G06N 3/08; G06N 3/088; G06N 3/0454; G06N 3/063; G06F 9/30036
See application file for complete search history.

(56) References Cited

U.S. PATENT DOCUMENTS 5,247,606 A * 9/1993 Tam ..................... G06N 3/0635
708/801
2003/0004583 A1 * 1/2003 Matsugu ................ G06N 3/049
700/5
2014/0229411 A1 8/2014 Richert et al.

FOREIGN PATENT DOCUMENTS

CN 103 279 958 A 9/2013

OTHER PUBLICATIONS

Camilleri, et al., "A neuromorphic aVLSI network chip with configurable plastic synapses", Seventh International Conference on Hybrid Intelligent System, pp. 296-301, Sep. 1, 20007 (Year: 2007).*

(Continued)

*Primary Examiner* — Sung S Ahn
(74) *Attorney, Agent, or Firm* — BakerHostetler

(57) ABSTRACT

A computer based on a spiking neural network, includes at least one maximum pooling layer. In response to an input spike received by a neuron of the maximum pooling layer, the device is configured so as to receive the address of the activated synapse. The device comprises an address comparator configured so as to compare the address of the activated synapse with a set of reference addresses. Each reference address is associated with a hardness value and with a pooling neuron. The device activates a neuron of the maximum pooling layer if the address of the activated (Continued)

synapse is equal to one of the reference addresses and the hardness value associated with this reference address has the highest value from among the hardness values associated with the other reference addresses of the set.

15 Claims, 16 Drawing Sheets

(56) References Cited

OTHER PUBLICATIONS

Fukushima, "Neocognitron: A self-organizing neural network model for a mechanism of pattern recognition unaffected by shift in position", Biological Cybernetics, 36(4), pp. 193-202, 1980.

Ciresan, et al., "Flexible, high performance convolutional neural networks for image classification", Proceedings of the Twenty-Second International Joint Conference on Artificial Intelligence—vol. Two, IJCAI' 11, pp. 1237-1242, 2011.

Camunas-Mesa, et al., "An event-driven multi-kernel convolution processor module for event-driven vision sensors", Solid-State Circuits, IEEE Journal of, 47(2), pp. 504-517, 2012.

Hafliger, "Adaptive WTA with an Analog VLSI Neuromorphic Learning Chip", IEEE Transactions on Neural Networks 18(2), (2007).

Yu, et al., "Biophysiologically Plausible Implementations of the Maximum Operation", Neural Computation, vol. 14, Issue 12, Nov. 2002.

Camilleri, et al., "A Neuromorphic aVLSI network chip with configurable plastic synapses", Seventh International Conference on Hybrid Intelligent Systems, pp. 296-301, Sep. 1, 2007.

Brown, et al., "Turning a Negative into a Positive: Ascending GABAergic Control of Cortical Activation and Arousal", Frontiers in Neurology, vol. 6, Jun. 11, 2015.

Zamarreño-Ramos, et al., "On Spike-Timing-Dependent-Plasticity, Memristive Devices, and Building a Self-Learning Visual Cortex", Frontiers in Neurology, vol. 5, Jan. 1, 2011.

Serrano-Gotarredona, et al., "STDP and STDP variations with memristors for spiking neuromorphic learning systems", Frontiers in Neurology, vol. 7, Feb. 1, 2013.

\* cited by examiner

| stop_in | Go | <= | = | spike | + | - | Ref | New @S | Stop_out |
|---|---|---|---|---|---|---|---|---|---|
| 0 | 0 | 0 | 0 | 0 | 0 | 1 | 0 | 0 | 0 |
| 0 | 0 | 0 | 1 | 1 | 1 | 0 | 0 | 0 | 0 |
| 0 | 0 | 1 | 0 | 1 | 0 | 0 | 1 | 1 | 1 |
| 0 | 0 | 1 | 1 | 1 | 1 | 0 | 0 | 0 | 0 |
| 0 | 1 | 0 | 0 | 0 | 0 | 1 | 0 | 0 | 0 |
| 0 | 1 | 0 | 1 | 1 | 1 | 0 | 0 | 0 | 0 |
| 0 | 1 | 1 | 0 | 0 | 0 | 0 | 0 | 0 | 0 |
| 0 | 1 | 1 | 1 | 1 | 1 | 0 | 0 | 0 | 0 |
| 1 | 0 | 0 | 0 | 0 | 0 | 1 | 0 | 0 | 1 |
| 1 | 0 | 0 | 1 | 1 | 1 | 0 | 0 | 0 | 1 |
| 1 | 0 | 1 | 0 | 0 | 0 | 0 | 0 | 0 | 1 |
| 1 | 0 | 1 | 1 | 1 | 1 | 0 | 0 | 0 | 1 |
| 1 | 1 | 0 | 0 | 0 | 0 | 1 | 0 | 0 | 1 |
| 1 | 1 | 0 | 1 | 1 | 1 | 0 | 0 | 0 | 1 |
| 1 | 1 | 1 | 0 | 0 | 0 | 0 | 0 | 0 | 1 |
| 1 | 1 | 1 | 1 | 1 | 1 | 0 | 0 | 0 | 1 |

FIGURE 14

COMPUTER FOR SPIKING NEURAL NETWORK WITH MAXIMUM AGGREGATION

CROSS-REFERENCE TO RELATED APPLICATIONS

This application is a National Stage of International patent application PCT/EP2018/068853, filed on Jul. 11, 2018, which claims priority to foreign French patent application No. FR 1757052, filed on Jul. 25, 2017, the disclosures of which are incorporated by reference in their entirety.

FIELD OF THE INVENTION

The invention relates generally to hardware neural networks and in particular to a computer based on a convolutional spiking neural network.

BACKGROUND

Hardware neural networks comprise neurons that are interconnected by synapses, which are conventionally implemented by digital memories. The synapses may also be implemented by resistive components the conductance of which varies as a function of the voltage applied across their terminals. Hardware neural networks are used in various fields (visual, audio, inter alia) in which signals are processed, such as for example in the field of image classification or of image recognition.

Convolutional neural networks correspond to a particular hardware neural network model. Convolutional neural networks were first described in the article by K. Fukushima, "Neocognitron: A self-organizing neural network model for a mechanism of pattern recognition unaffected by shift in position. *Biological Cybernetics*, 36(4):193-202, 1980. ISSN 0340-1200. doi: 10.1007/BF00344251".

Convolutional neural networks (CNNs) are used notably in image-classification systems to accelerate classification. Applied to image recognition, these networks make it possible to learn intermediate representations of objects in the images, which intermediate representations are smaller and able to be applied generally to similar objects, thereby facilitating recognition thereof. However, the intrinsically parallel operation and complexity of conventional convolutional neural network classifiers limit the implementation thereof in embedded systems, which impose strict constraints in terms of surface area and consumption.

Some solutions for implementing hardware neural networks on graphic processing units (GPUs) have been proposed with a view to improving the performance thereof, such as for example the solution described in the article by D. C. Ciresan, U. Meier, J. Masci, L. M. Gambardella, and J. Schmidhuber, "Flexible, high performance convolutional neural networks for image classification. Proceedings of the Twenty-Second International Joint Conference on Artificial Intelligence—Volume Two", IJCAI' 11, pages 1237-1242, 2011. ISBN 978-1-57735-514-4. doi: 10.5591/978-1-57735-516-8/IJCAI11-210.

A plurality of hardware implementations of spiking convolutional networks have in particular been proposed in L. Camunas-Mesa, C. Zamarreno-Ramos, A. Linares-Barranco, A. Acosta-Jimenez, T. Serrano-Gotarredona, and B. Linares-Barranco. "An event-driven multi-kernel convolution processor module for event-driven vision sensors." *Solid-State Circuits, IEEE Journal of*, 47(2):504-517, 2012. ISSN 0018-9200. doi: 10.1109/JSSC.2011.2167409. Such a convolutional implementation uses a separate digital memory to store the coefficients of the convolution kernels, with the coefficients of the kernel of the memory being copied to the computation unit (ALU) at each spike arrival.

A neural network consists of one or more convolution layers, which may possibly include what are called pooling layers. The output of a convolution layer may be connected to the input of the following layer. The convolution layers consist of neurons. In a convolution layer, each neuron is connected to at least one portion (sub-matrix) of the input matrix I. The sub-matrices have the same size for one and the same data layer, the size of the sub-matrices defining the size of the filter.

A convolution or pooling layer may consist of one or more output matrices (also called "output maps" or "output feature map"), each output map being able to be connected to one or more input matrices (also called "input maps").

In a neural network, the neurons are connected to their input sub-matrix I by synapses the weight of which is adjustable. The matrix K of the synaptic weights (also called "weight coefficient" or "convolution coefficients") that is applied to the input sub-matrices of the neurons is the same for all of the neurons of one and the same output map (or "feature map"). Such a matrix K is also called "convolution kernel" or "filter" or "convolution matrix".

A convolution layer may comprise one or more convolution kernels that each have an input matrix, which may be the same, but that have different coefficients corresponding to different filters. Each convolution kernel in a layer produces a different output map so that the output neurons are different for each kernel. When the convolutional networks include local or global pooling layers, these pooling layers combine the group outputs of neurons of one or more output maps. Combining the outputs may consist for example in taking, for the corresponding output, the maximum ("MaxPooling") or average value of the outputs of the neuron group on the output map of the pooling layer.

The maximum pooling layers "MaxPooling" allow the size of the output maps to be decreased from one layer to the next in the network, while at the same time improving its performance by making it more tolerant to small deformations or translations in the input data.

The "MaxPooling" layers are used in many neural networks including notably conventional neural networks (CNN).

The "Maxpooling" grouping furthermore makes it possible to drastically increase performance in neural networks and to reduce the number of signals to be emitted.

In the case of what is known as a spiking neural network using frequency coding, the "MaxPooling" layers are used to select the higher-frequency signals.

There are several approaches to implementing this "MaxPooling" function for a spiking neural network, either using a subnetwork or by changing the neuron model.

In implementations based on changing the neuron model, considering a neuron having N synapses, the implementations used to perform a conventional "MaxPooling" function require N C-bit counters (where C is the accuracy of the activity counter) as well as a sorting function, thereby requiring numerous resources.

For example, in some known implementations, the "MaxPooling" function is performed by a "Winner Takes All" (WTA) function applied by area. Such a WTA solution is conventionally used in dedicated computers based on a WTA network, as described for example in the article "Adaptive WTA with an Analog VLSI Neuromorphic Learning Chip", IEEE Transactions on Neural Networks 18(2) (2007) by Hafliger Philip or else in the article "Biophysiologically Plausible Implementations of the Maximum Operation", Neural Computation, Volume 14, Issue 12 (November 2002), by Angela J. Yu, Martin A. Giese, and Tomaso A. Poggio. In WTA implementations, the neurons that are used have a conventional "Integrate and Fire" or IF model, or a Leaky Integrate and Fire (LIF) model, the structure of the network and the learning rules forming the WTA function.

However, WTA networks require an additional learning process and are too complex in terms of hardware.

There is therefore a need for an optimized neural network architecture-based computer for performing the maximum pooling function ("MaxPooling").

SUMMARY OF THE INVENTION

The invention aims to improve the situation by proposing a computer based on a spiking neural network, the network comprising layers of neurons, the inputs and outputs of each neuron being coded by spikes, the input spikes being received in sequence at the input of a neuron, each neuron of the network comprising a receptive field comprising at least one synapse. Each synapse is associated with a synapse address. The computer is configured so as to compute, for each layer of neurons, the output value of each neuron in response to at least one input spike. The network furthermore comprises at least one maximum pooling layer ("MaxPooling" layer), each pooling layer comprising maximum pooling neurons, each maximum pooling neuron being able to deliver an output spike in response to the reception of an input spike on the most active synapse of its receptive field (i.e. synapse of the receptive field of the maximum pooling neuron having the highest frequency). According to one aspect of the invention, the computer comprises a device for activating the neurons of the maximum pooling layer. In response to an input spike received by a neuron of the maximum pooling layer, the device is configured so as to receive the address of the synapse associated with the received input spike, called activated synapse address, the device comprising an address comparator configured so as to compare the address of the activated synapse with a set of reference addresses, comprising at least one reference address, each reference address being associated with a hardness value and with a pooling neuron. The device is configured so as to activate a neuron of the maximum pooling layer if the address of the activated synapse is equal to one of the reference addresses, and the hardness value associated with this reference address has the highest value from among the hardness values associated with the other reference addresses of said set.

In one embodiment, the device may comprise a counter configured so as to increment the hardness value associated with a reference address of said set of reference addresses by a chosen incrementation value, if the reference address is equal to the activated synapse address, the device furthermore being configured so as to deliver an output spike value set to the value '1' (one), in association with the reference address.

The device may furthermore comprise a hardness value comparator for comparing the hardness value with zero, whereas the counter is configured so as to decrement the hardness value associated with a reference address by a chosen decrementation value, if the reference address of the set of reference addresses is different from the activated synapse address and if the hardness value comparator indicates that the hardness value is strictly greater than zero.

According to some embodiments, the device may be configured so as to set a reference address to the value of the activated synapse address, if the reference address is different from the activated synapse address and if the hardness value is less than or equal to '0' (zero), the device furthermore being configured so as to deliver an output spike value with the value '1' (one) associated with the reference address and set the hardness value associated with the reference address to a predefined initialization value.

The device may be configured so as to determine the address of the hardness value having the maximum value and to deliver, at the output of the neuron of the maximum activation layer, an output spike value corresponding to the value of the output spike associated with the reference address corresponding to the hardness value.

In one embodiment, the device may comprise at least one address memory for storing said reference addresses and at least one hardness value memory for storing the hardness values associated with each reference address, each reference address in the address memory being associated with a hardness value in the hardness value memory.

Advantageously, the device may comprise at least one initialization value memory for storing at least one initialization value.

In particular, the device may comprise a different initialization value for each reference address and the initialization value memory may comprise a data structure, each input of the data structure being configured so as to store an initialization value associated with a reference address.

According to some embodiments, the computer may be implemented in the form of a digital circuit.

As a variant, the computer may be implemented in the form of an analog circuit.

What is furthermore proposed is a method for computing the output values of neurons in a spiking neural network comprising at least one layer of neurons, in response to at least one input spike, the inputs and outputs of each neuron being coded by spikes, the input spikes being received in sequence at the input of a neuron, each neuron of the network comprising a receptive field comprising at least one synapse, each synapse being associated with a synapse address, the neural network furthermore comprising at least one maximum pooling layer, each pooling layer comprising maximum pooling neurons, each maximum pooling neuron being able to deliver an output spike in response to the reception of an input spike on the most active synapse of its receptive field. The method comprises a step of activating the neurons of the maximum pooling layer. In response to an input spike received by a neuron of the maximum pooling layer, the activation step comprises the steps of:

receiving the address of the synapse associated with the received input spike, called activated synapse address, comparing the address of the activated synapse with a set of reference addresses, comprising at least one reference address, each reference address being associated with a hardness value and with a pooling neuron;

activating a neuron of the maximum pooling layer if the address of the activated synapse is equal to one of the reference addresses and the hardness value associated with this reference address has the highest value from among the hardness values associated with the other reference addresses of the set.

In one embodiment, the method may comprise the steps of:

incrementing the hardness value associated with a reference address of said set of reference addresses by a chosen incrementation value, if the reference address is equal to the activated synapse address, and delivering an output spike value set to the value '1' (one) for the maximum pooling neuron, in association with the reference address.

The method may furthermore comprise a step of comparing the hardness value with zero, and decrementing the hardness value associated with a reference address by a chosen decrementation value, if the reference address of said set of reference addresses is different from the activated synapse address and if the hardness value is strictly greater than zero.

In one embodiment, the method may comprise the steps of:

setting a reference address to the value of the activated synapse address, if the reference address is different from the activated synapse address and if the hardness value is less than or equal to zero, delivering an output spike value set to the value '1' (one) in association with the reference address, and setting the hardness value associated with the reference address to a predefined initialization value.

The method may also comprise the steps of:

determining the address of the hardness value having the maximum value, and delivering, at the output of the neuron of the maximum pooling layer, an output spike value corresponding to the value of the output spike associated with the reference address corresponding to the hardness value.

The invention thus makes it possible to approximate the maximum pooling/union function ("MaxPooling"). This results in a gain in terms of memory and a significant reduction in the resources required to perform the MaxPooling function for positive spikes, received sequentially, and to do so without a significant loss of classification performance of the network.

The embodiments of the invention furthermore make it possible to reduce memory and reduce computational complexity and therefore the hardware resources necessary for implementing the "MaxPooling" function.

Some embodiments may be implemented in a digital architecture, without changing memory access operations and the size of the memory already instantiated for computing the response of a spiking neuron. As a variant, they may be implemented in an analog architecture.

Although it is not limited to such applications, the invention has particular advantages in spiking neural network accelerator applications.

BRIEF DESCRIPTION OF THE DRAWINGS

Other features and advantages of the invention will become apparent with the aid of the following description and the figures of the appended drawings, in which:

FIG. 14 shows the lookup table for the input/output signals of the device for triggering the neurons of a maximum pooling layer;

Figure 1:
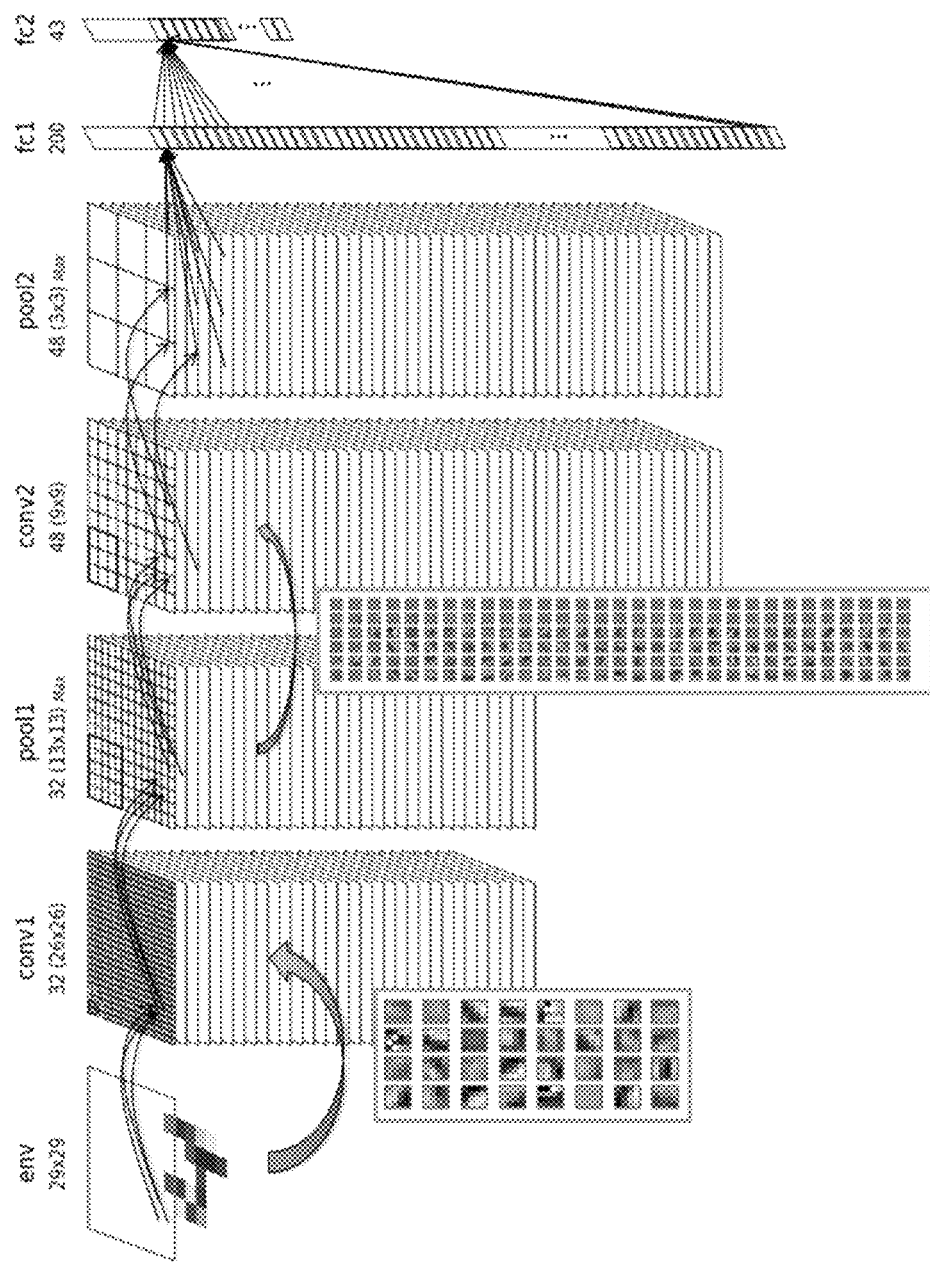
FIG. 1 shows an example of a convolutional network including pooling layers, for the classification of images and of perceptrons.

The drawings will not only serve to allow the description to be better understood, but may, where appropriate, also contribute to the definition of the invention.

DETAILED DESCRIPTION

To facilitate understanding of some embodiments, certain features and definitions of convolutional neural networks are given below.

A neural network consists of one or more convolution layers, where the convolution layers may include one or more pooling layers (the term "pooling" is also called "union" or "aggregation" or "grouping"). The layers may be followed by a multilayer perceptron classifier. The output of a convolution layer may be connected to the input of the following layer.

Each convolution layer takes its inputs on the outputs of the preceding layer. A given convolution layer consists of a number of neurons.

In a convolution layer, each neuron is connected to at least one portion (also called "sub-matrix" or "receptive field") of the input matrix. The sub-matrices may have the same size for one and the same layer, and their size may be equal to the size of the filter. The sub-matrices may be offset regularly from one another and may overlap.

A convolution layer thus processes the data from the receptive fields of the neurons.

A convolution layer comprises one or more output matrices comprising a set of output neurons, each output matrix being connected to an input matrix (the input matrix comprising a set of input neurons) by artificial synapses associated with a convolution matrix comprising the synaptic weight coefficients corresponding to output neurons of the output matrix (synaptic weights) (the synaptic weight coefficients are also called "synaptic weights" or "weight coefficient" or "convolutional coefficients" or "weightings"). The output value of each output neuron is determined from those input neurons of the input matrix to which the output neuron is connected and the synaptic weight coefficients of the convolution matrix associated with the output matrix. The internal value of a neuron is thus determined by summing the signals arriving at the neuron, after weighting by the synaptic coefficients, from the connected neurons, the output of a neuron being determined by applying a transfer function to the internal value of the neuron.

The input matrix may be an image of any size. The input matrix may for example be a two-dimensional (2D) image, each pixel of the image being represented by a neuron and having values represented in grayscale, the position of a given pixel (neuron) being provided by the XY coordinates. For a color image, a plurality of grayscales and a plurality of input matrices may be used. The coordinates of a pixel are then expressed in XYZ.

In a neural network, the neurons are connected to their input sub-matrix I by synapses the weight of which is adjustable. The matrix K of the synaptic weights that is applied to the input sub-matrices of the neurons is the same for all of the neurons of a given output map (or "feature map"). Such a matrix K is also called "convolution kernel" or "filter". As the convolution kernel is shared for all of the neurons of one and the same output map O, and is therefore applied to the whole of the input matrix, this results in a reduction in the memory necessary to store the coefficients, thereby optimizing performance. For example, for image recognition, this makes it possible to minimize the number of filters or intermediate representations that best code the features of the image and that are reusable over the whole image. The coefficients of a convolution kernel K may correspond to conventional signal processing filters (for example Gaussian, Gabor, Laplace, etc. filters), or be determined by supervised or unsupervised learning, for example using a gradient backpropagation algorithm. The coefficients of the convolution kernels may be positive or negative and are generally normalized between −1 and 1. The input and output values of the neurons are also normalized between −1 and 1.

A convolution layer may comprise one or more convolution kernels that each have an input matrix, which may be the same, but that have different coefficients corresponding to different filters.

Each convolution kernel in a layer produces a different output map. The output neurons are therefore different for each kernel.

The pooling layers combine outputs of neuron groups of the preceding layers. The pooling layers thus make it possible to compress the information by reducing the size of the intermediate images.

In the embodiments of the invention, the convolutional neural network comprises at least one maximum pooling layer configured so as to combine the outputs of the preceding layer by taking the maximum value ("MaxPooling"). The convolutional neural network may comprise other pooling layers (of maximum type or of another type).

A maximum pooling layer is associated with a discretization method based on subsampling. The discretization method makes it possible to reduce the dimensionality (spatial size) of the input matrix of the maximum pooling layer, by applying a filter to rectangular sub-matrices of the input matrix (representing the input image) that do not overlap, the filter determining the maximum value of each subregion and generating an output matrix in which each element corresponds to the maximum computed for a subregion.

The signal at the output of each rectangular sub-matrix is defined according to the values taken by the various neurons (pixels) of the rectangular sub-matrix.

In some embodiments, a pooling layer may be periodically inserted between two successive convolution layers of a CNN convolutional neural network-based architecture in order to control overfitting.

The rectangular sub-matrices of a maximum pooling layer may for example be of size 2×2 (width/height) and have, as output value, the maximum value of the input rectangular sub-matrix ("Max-Pool 2×2" with compression by a factor of 4). The maximum pooling layer then corresponds to a 2×2 filter.

FIG. 1 shows an example of a convolutional network including pooling layers, for the classification of images. The images shown at the bottom of FIG. 1 show an extract of the convolution kernels of the first layer, after gradient backpropagation training on an image base such as ImageNet.

Figure 2:
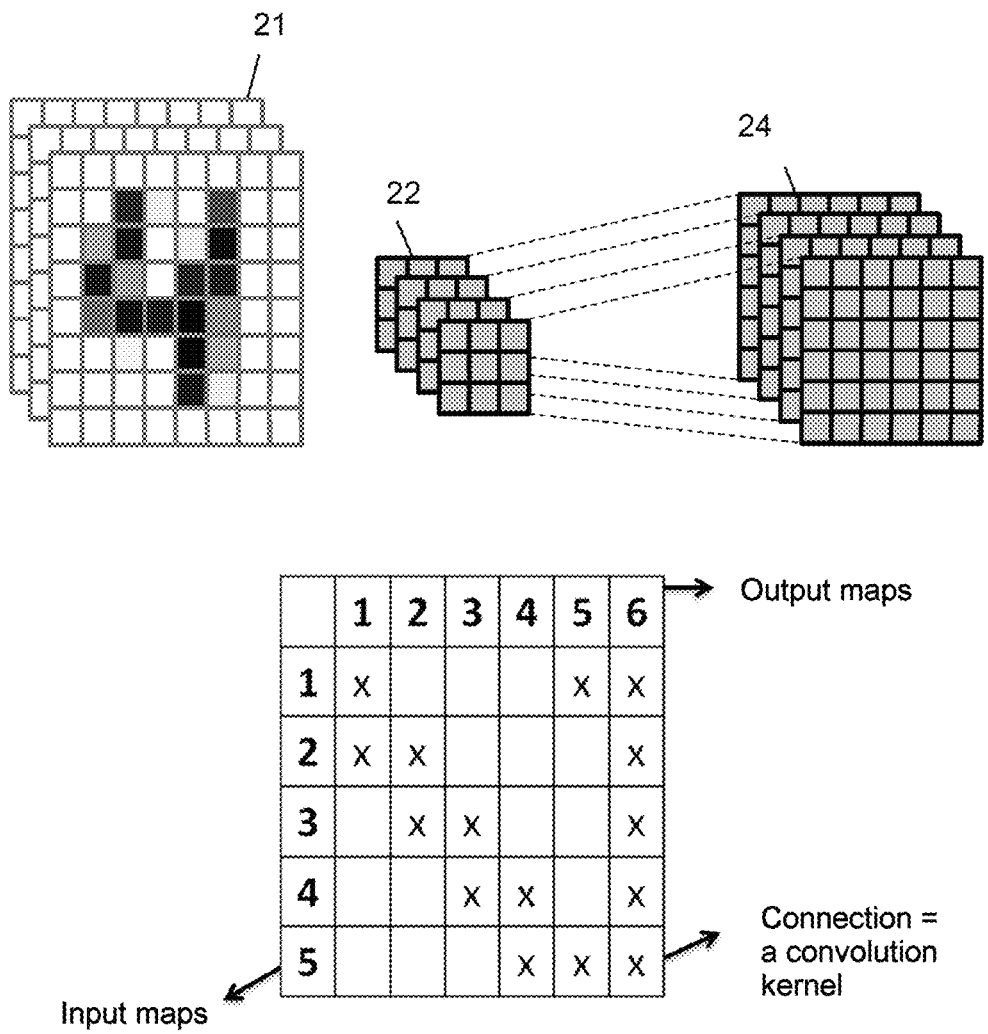
FIG. 2 is a diagram showing a convolution layer consisting of a plurality of output maps.

As illustrated in FIG. 2, a convolution or pooling layer may consist of one or more output matrices 24 (also called "output maps" or "output feature map"), each output map being able to be connected to one or more input matrices 21 (also called "input maps").

Figure 3:
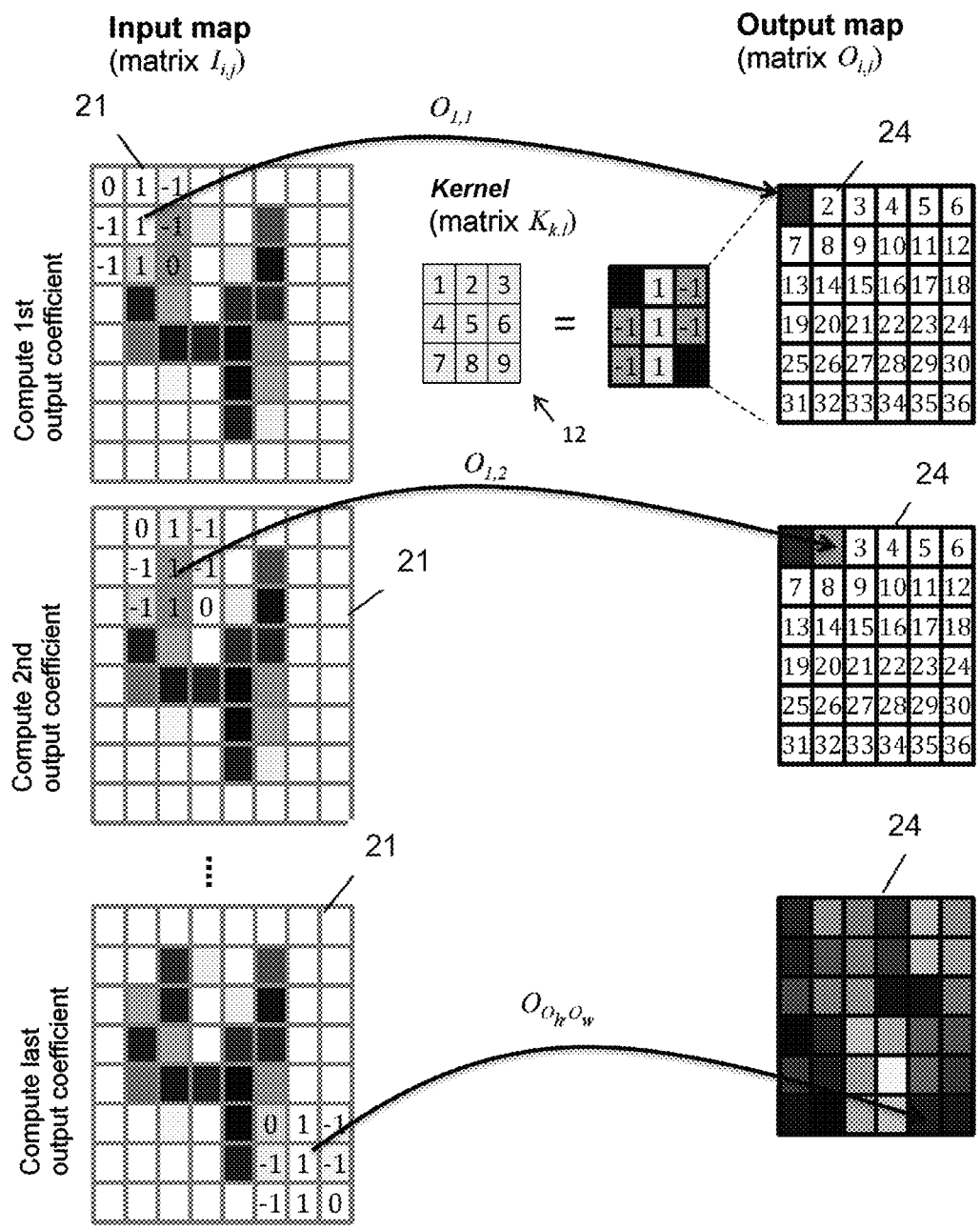
FIG. 3 illustrates the operating principle of a convolution layer in a convolutional neural network.

As illustrated in FIG. 3, an output matrix, denoted O, contains coefficients $O_{i,j}$, and has a size denoted $(O_h, O_w)$. This matrix corresponds to a matrix of neurons and the coefficients $O_{i,j}$ correspond to the output values of these neurons, computed on the basis of the inputs and of the synaptic weights.

An input matrix or map 21 may correspond to an output map of a preceding layer or to an input matrix of the network that receives stimuli or a portion of the stimuli to be processed. A network may consist of one or more input matrices 21. It may for example be a question of RGB, HSV, YUV components or of any other conventional image component, with one matrix per component. An input matrix, denoted I, contains coefficients $I_{i,j}$ and has a size denoted $(I_h, I_w)$.

An output map O may be connected to an input matrix I by a convolution operation, via a convolution kernel 22 denoted K (the convolution kernel is also called a filter, or convolution matrix), of size (n, m) and containing coefficients $K_{k,l}$. Each neuron of the output map 24 is connected to a portion of the input matrix 21, this portion also being called "input sub-matrix" or "receptive field of the neuron" and being the same size as the convolution matrix K. The convolution matrix K containing the synaptic weights is common to all of the neurons of the output map O (the weights of the matrix K are then said to be "shared weights"). Each output coefficient of the output matrix $O_{i,j}$ then satisfies the following formula:

$$O_{i,j} = g\left( \sum_{k=0}^{min(n-1, I_h - i \cdot s_i)} \sum_{l=0}^{min(m-1, I_w - j \cdot s_j)} I_{i \cdot s_i + k, j \cdot s_j + l} \cdot K_{k,l} \right)$$

In the above formula, g( ) denotes the activation function of the neuron, whereas $s_i$ and $s_j$ denote vertical and horizontal stride parameters, respectively. Such a stride corresponds to the offset between each application of the convolution kernel on the input matrix. For example, if the stride is greater than or equal to the size of the kernel, then there is no overlap between each application of the kernel.

An output map O is connected to an input matrix/by a pooling operation that sub-samples the input matrix, this delivering a sub-sampled matrix.

The sub-sampling applied by each maximum pooling layer "Max pooling" may be defined by the equation below:

$$O_{i,j} = g(\max_{k=0}^{min(n-1,J_h-i,s_i)} \max_{l=0}^{min(m-1,J_w-j,s_j)} I_{i,s_i+k,j,s_j+l})$$

The synaptic weights associated with the connections in the case of a pooling layer are generally unitary and therefore do not appear in the above formulae.

A completely connected layer comprises a set of neurons, each neuron being connected to all of the inputs of the layer. Each neuron $O_j$ has its own synaptic weights $W_{i,j}$ with the corresponding inputs $I_i$ and performs the weighted sum h( ) f the input coefficients with the weights, which is then passed to the neuron activation function g( ) in order to obtain the output of the neuron:

$$O_j = g\left(\sum_i I_i \cdot W_{i,j}\right)$$

The neuron activation function g( ) is generally a sigmoid function, such as for example the function tan h( ) For the pooling layers, the activation function may for example be the identity function.

The synaptic weights may be determined by training. The training of a neural network consists in finding the optimal values of the synaptic weights using an optimization method and a training base. There are many training methods such as the gradient backpropagation method, the basic principle consisting, on the basis of a stimulus at the input of the network, in computing the output of the network, comparing it to the expected output (in the case of what is called supervised training) and back-propagating an error signal through the network, which amounts to modifying the synaptic weights via a gradient-descent method.

In the embodiments of the invention, the neural network is "spiking", the input and output values of a neuron (neuron called "spiking neuron") being coded with spikes.

A spiking neuron may be defined by at least two functions:
  an integration function that integrates the values at the input of the neuron and that may implement a leakage.
  an activation function that takes as parameters the values of the integration and provides the output values of the neuron.

An activation function is defined by a value-limited, parameterized nonlinear algebraic function that has real what are called "input" variables depending on the neuron model that is used.

A neuron is furthermore characterized by the activation function g( ) used to compute the response of a neuron (representing the internal value of the neuron) to an input event, a threshold and synaptic weights.

An input or output value of a spiking neuron may be coded by the number of spikes received by the neuron during a fixed time window (frequency coding), or by the time of emission of a received spike using a rank order coding technique. In networks of spiking neurons with frequency coding, computing a weighted sum h is achieved by accumulating the coefficient of the convolution kernel at each arrival of a spike on the corresponding input. The activation function of the neuron g may in this case be replaced by a threshold. When the absolute value of the sum h exceeds the threshold following the arrival of a spike on the input sub-matrix, the output neuron emits a spike of the sign of h and resets the weighted sum h to the value 0. The neuron then enters into what is called a "refractory" period during which it is no longer able to emit spikes for a fixed period. The spikes may therefore be positive or negative, depending on the sign of h when the threshold is exceeded. A negative spike at input inverts the sign of the coefficient of the corresponding kernel for the accumulation.

The model of a neuron (also called "computational neuron model") is defined by a nonlinear algebraic function that makes it possible to compute the output of a neuron from the internal value of the neuron. This function may take, as argument, the integration value (representing the value internal to a neuron) but also, depending on the models, the time or the output of an internal counter. As used here, the expression "integration" denotes the integral with respect to time of the weighted spike trains at the input of the neuron (i.e. the temporal integral of a weighted spike train, such as a Dirac comb for example). The internal value of a neuron (called "integration" or "integration value") may be reset to zero when the neuron triggers. A neuron "triggers" when it produces an output spike.

Computational spiking-neuron models define the computation of the temporal integration of the information. The response of a neuron to a stimulation is the emission time of the next spike. A spike is emitted at the output of a neuron at the moment at which the excitation of the neuron exceeds the threshold. A virtual clock may be used to delay the emissions of spikes from the neurons, the spikes possibly then being considered to be dated events. There are several types of spiking-neuron models, such as for example:

The Hodgkin and Huxley (HH) model, which is defined by four interdependent differential equations, and which describes the dynamic temporal behavior of the neuron by way of variations in ion (K+, Ca2+) concentrations in various compartments and reproduces the main "modes" of operation of biological neurons.

The Integrate and Fire (IF) model, which is described by a single differential equation and which models the integrated circuit in the form of an electric circuit comprising a capacitor and a resistor (RC dipole). In this model, the dynamic behavior of the neuron is described by its membrane potential and by the current that flows therethrough.

Models related to the IF model such as the Leaky Integrate and Fire (LIF) model or the Quadratic Integrate and Fire (QIF) model, the conductance Integrate & Fire (gIF) model;

The Spike Response Model (SRM), which is based on the behavior of neurons (phenomenological modeling of neurons); this model comprises a kernel function providing the dynamic behavior of the membrane potential of the neuron and a function that computes the sum of the post-synaptic potentials;

The Izhikevich model (Izhikevich, 2003), which uses two coupled differential equations to model the ion flux and the potential dynamics of the neuron.

A spiking neuron produces, initially, the integral of the weighted spikes (with or without leakage depending on the neuron model). The spikes may be unitary in value, i.e. 1 or −1 (the value "−1" is not always used). The weightings are defined by the coefficients of the filter (convolution kernel). The value resulting from the integration is denoted I: g(I). Conventionally, g may take the form of a sigmoid function, such as for example the hyperbolic tangent function.

Figure 4:
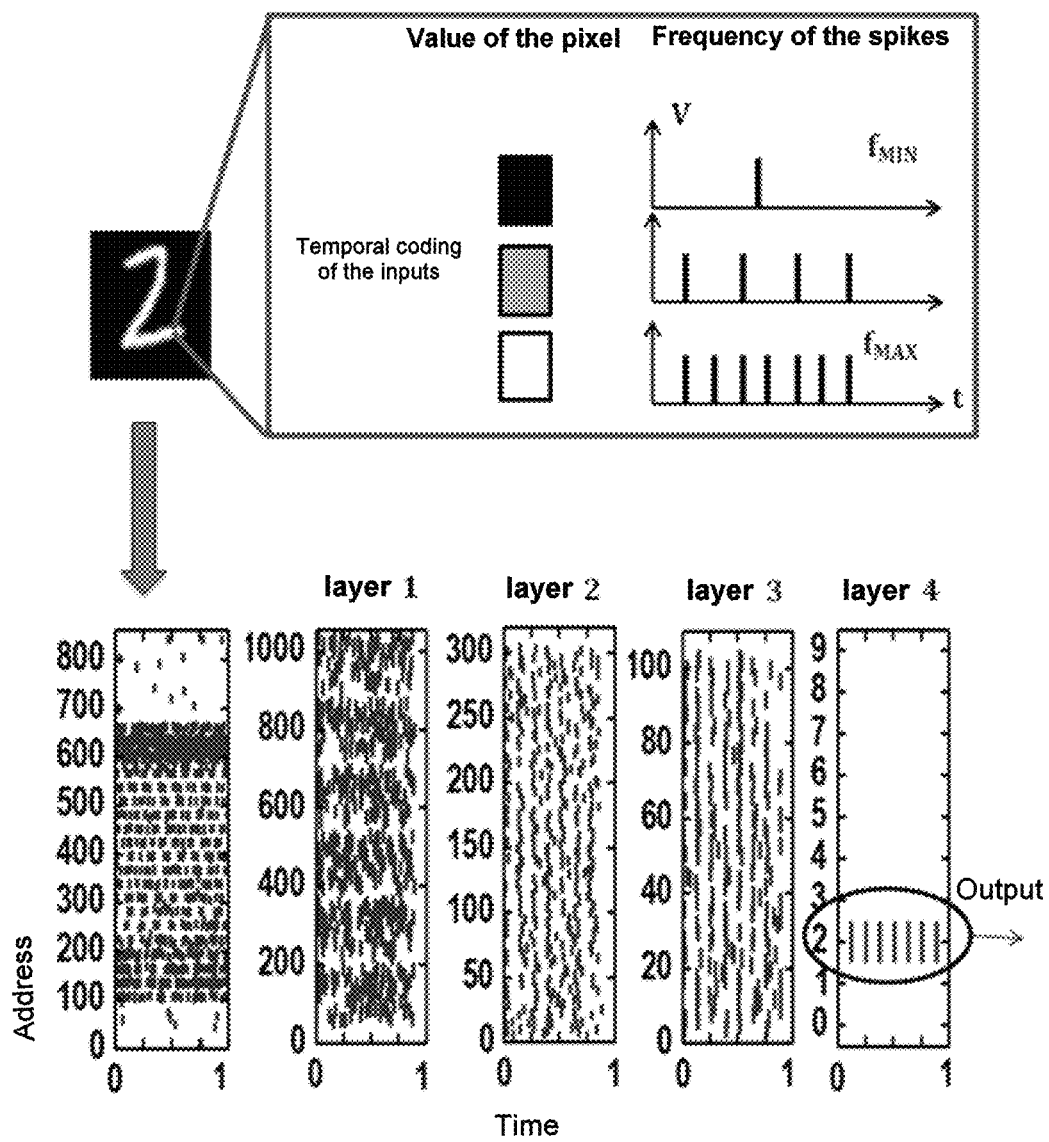
FIG. 4 is a diagram illustrating spike coding and propagation in the spiking neural network.

The networks of neurons may be transposed via spike coding as illustrated in FIG. 4. In this case, the signals propagated at the input and at the output of the layers of the network are no longer numerical values, but electrical spikes (similar to Dirac spikes). The information that was coded in the value of the signals (normalized between −1 and 1) is then temporally coded with the order of arrival of the spikes (rank-order coding) or with the frequency of the spikes.

In the case of rank-order coding, the arrival time of the spike is inversely proportional to the absolute value of the signal to be coded. The sign of the spike then determines the sign of the value of the signal to be coded.

In the case of frequency coding, the frequency of the spikes, of between $f_{min}$ and $f_{max}$, is proportional to the absolute value of the signal to be coded. The sign of the spike determines the sign of the value of the signal to be coded. For example, considering an input matrix of the network corresponding to the brightness component of an image, normalized between 0 and 1, a pixel (or coefficient of the matrix) that is white, coded with a value 1, will emit spikes at a frequency $f_{max}$, a black pixel, coded by a value 0, will emit spikes at a frequency $f_{min}$, whereas a gray pixel, coded by a value x, will emit spikes at a frequency $f=f_{min}+x(f_{max}-f_{min})$. The coding may also be pseudo-frequency coding, poissonian for example: in this case $f_{max}$ and $f_{min}$ are merely average frequencies. The initial phase of the spikes may be random.

The spikes may also originate directly from a sensor, such as an artificial cochlea or a retina, imitating the operation of their biological equivalent.

In the embodiments of the invention, the convolutional neural network under consideration is a spiking convolutional neural network receiving the spikes one by one. It may in particular use frequency coding. The "MaxPooling" layers are then used to select the higher-frequency signals. As a variant, the convolutional neural network may use phase coding.

Figure 5:
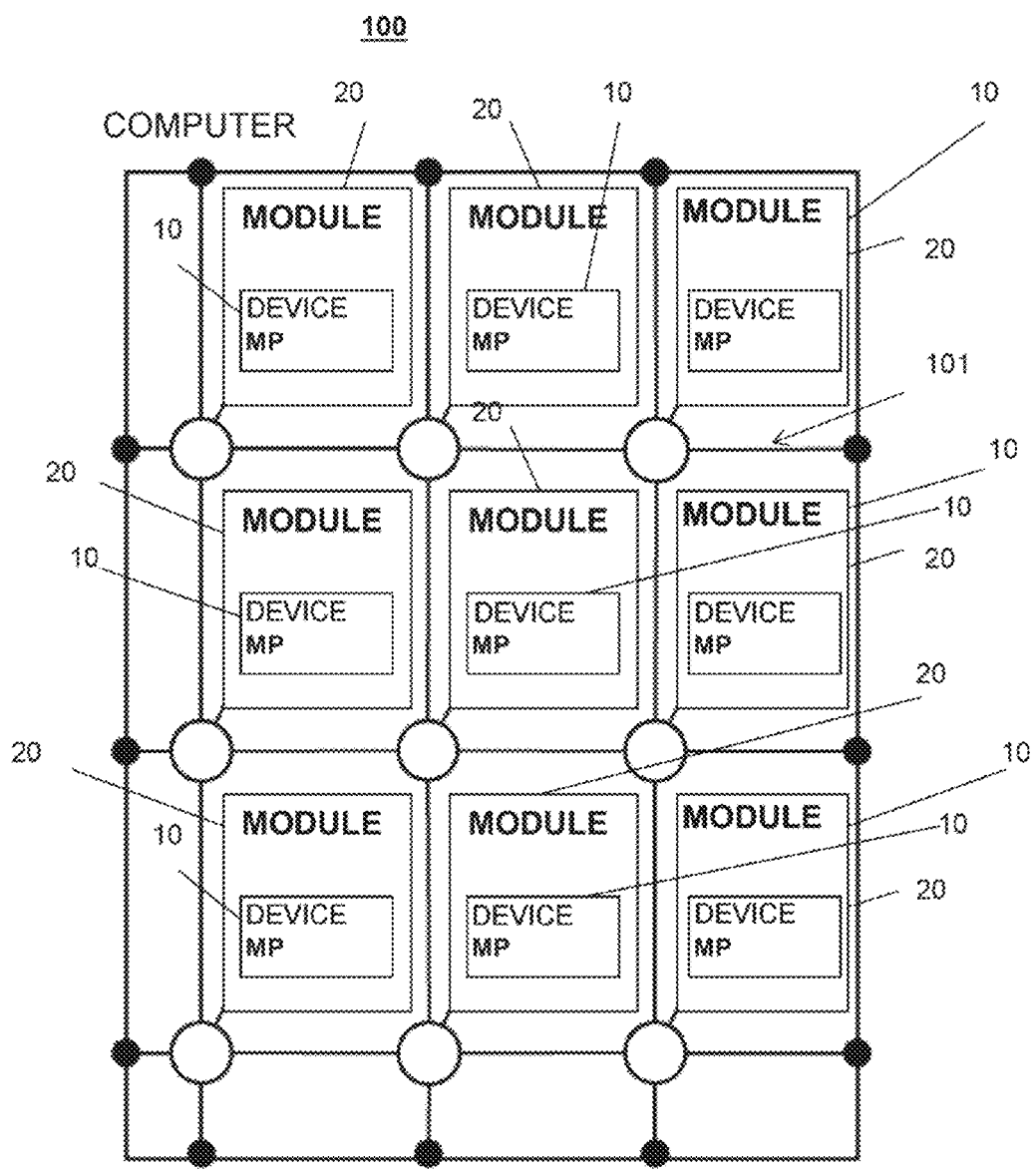
FIG. 5 schematically shows a computer for computing at least one convolution layer and the response of the neurons of the maximum pooling layers, according to some embodiments.

FIG. 5 schematically shows a computer 100 configured so as to compute at least one convolution layer of a convolutional neural network with spike coding, in response to an input event, the convolutional neural network comprising at least one convolution kernel 12, the convolution kernel comprising weight coefficients. The computer 100 comprises at least one convolution module 20 (also called "convolution block") configured so as to compute the responses of the neurons (internal value of the neurons) of each convolution layer that are triggered by an input event, each convolution layer consisting of one or more output maps.

The input and the output are connections to the network on chip (NOC) system, that is to say there is at least one connection of the NOC used to communicate with the computer 100. The formalism of the inputs and outputs of the system 100 is the same as for the modules 20, that is to say events consisting of at least one address value.

Each convolutional computation module 20 may be configured so as to compute the internal value (also called "integration value") of the neurons of a convolution layer that have received a spike (input event). When this integration value exceeds a predefined threshold, the neurons are "triggered" or "activated" and emit a spike event at output. The computation of a convolution layer thus consists in determining the response (output value) of the neurons of the convolution layer to an input spike event.

The convolution computation modules 20 may be interconnected by an interconnect system 101. In one embodiment, the convolution computation modules 20 may be interconnected using a network on chip (NOC) system. A network on chip allows the events to be redirected between the modules and/or the inputs/outputs. The network ensures the connection between the various layers of the neural network 1. In some embodiments, the network on chip may additionally implement a function for managing the priorities and synchronization of the input events.

The rest of the description will make reference to an interconnect system of the network-on-chip type by way of nonlimiting example. Those skilled in the art will however easily understand that other interconnect systems may be used, such as for example programmable interconnect systems (e.g. FPGAs), static-routing interconnect systems, etc. Each convolution computation module carries out a convolution operation on a or a portion of a layer of the network.

Each convolution module 20 may be used to compute the responses of the neurons of a convolution layer associated with a convolution kernel ("filter"). In other embodiments, each convolution module 20 may be used to compute the responses of the neurons of a plurality of convolution layers. In yet another embodiment, when a convolution module 20 is not designed to compute all of the responses of the neurons of a given convolution layer (i.e. if the network exceeds the capacity of a module), a plurality of convolution modules may be used to compute the responses of this convolution layer. The network is then distributed into any number of modules 20.

Each convolution module 20 may comprise one or more computing elements, such as processors or sub-computers.

Each computation module 20 may compute the internal value of one or more neurons triggered by an input event, using the weight coefficients of the convolution kernel.

An input event is represented by a spike arriving on the neural network. A spiking neural network may receive, over time, a train of spikes, each spike possibly triggering one or more neurons.

A spike representing an input event is defined by an input address on the convolution layer.

As used here, the "input address" of a spike represents the address of the spike emitted by the preceding convolution layer and received by the convolution layer under consideration (the input of the layer under consideration thus consists of the outputs of the "preceding" layer). When the spikes are transmitted by a serial bus, they therefore propagate with them at least their emission address.

When a spike, defined by an input address, arrives on a convolution layer, the connection between the output neurons and the input neurons on the input map is such that the spike is not received by all of the neurons of this layer. Thus, for a given incoming spike, there are neurons that may not receive this spike, at the same time. Such neurons are said to be "independent". In addition, the number of neurons receiving one and the same spike at the same time is at most equal to the size of the convolution filter associated with the convolution layer. These two properties are due to the topology of convolutional networks.

In certain applications of the invention, the computer 100 may be a multicore distributed-memory computer, each core possibly being interconnected by the interconnect system 101.

The various convolution layers 4 of the convolutional neural network 1 may be distributed over the various modules 20. As a variant, the convolution layers 4 may be associated with one and the same module 20 using z and L offsets and a loop going from the convolution module 20 to itself.

To compute the response of the triggered neurons (internal value of a neuron), each convolution module 2 may use one or more chosen computational neuron models. The neuron model may be defined during programming of the system. In some embodiments, it may be identical for all of the neurons of a layer.

Each computation module 2 may thus be configured so as to determine and deliver, at output, output values representing the values at the output of each independent neuron of the layer. The computed output value for a given triggered neuron results from the integration of the input values received by this neuron over time, weighted by a weight coefficient of the convolution kernel. This temporal integration is determined using the activation function (also called "transition function"), which depends on the computational neuron model.

Each computation module 2 is thus able to compute the output value of each neuron corresponding to the temporal integration at the time t from the temporal integration at t−1 and from the convolution coefficient (weight coefficient) associated with the time t.

Each computation module 2 may be connected to an output manager in order to manage the output order of the events, for example by implementing a serialization system with a prioritization function. The serial protocol used at output may be as desired, for example AER (acronym for Address-Event Representation). According to the AER representation, two connected neurons share one and the same time-multiplexed digital bus. An event is encoded in the form of an address (as used here, an address is an identifier, that is to say a number that identifies the neuron producing the event) and is transmitted on the digital bus. On the reception side, the address is again converted into spikes that are distributed on the receiver neurons connected to the emitter neuron.

The convolutional neural network with spike coding 1 furthermore comprises at least one maximum pooling layer ("MaxPooling") configured so as to combine outputs of the preceding convolution layer by taking the maximum value.

A neuron of a conventional maximum pooling layer triggers if its most active synapse (i.e. the one that has received the most spikes, or in other words the highest-frequency synapse) receives a stimulus, by comparing the activity of its synapses in order to select the most active synapse. The embodiments of the invention make it possible to determine the response of a neuron of a maximum pooling layer without it being necessary for each of the N synapses to count each received spike and to store the activity of each synapse.

According to the embodiments of the invention, at least one convolution module 20 from among the convolution modules 20 of the computer comprises a device 10 for triggering the neurons of each maximum pooling layer (called maximum pooling neuron or neuron MP), the device 10 being configured so as to trigger (or activate) the neurons MP of each maximum pooling layer that have received an input spike and determine the value of the output spike from each neuron MP in response to an input spike received by the neuron MP depending on the address of the synapse of the receptive field of the neuron MP that is activated by the input spike.

In the example of FIG. 5, each convolution module 20 comprises a device 10 for triggering the neurons MP.

The maximum pooling computation device 10 (hereinafter also called "maximum pooling computation device" or else "maximum pooling device") thus computes the response (output value) of a neuron MP of a maximum pooling layer to an input spike.

The maximum pooling computation device 10 is configured so as to generate an output event only if the address of the input event received by the neuron MP corresponds to the most active address in the pool.

Figure 6:
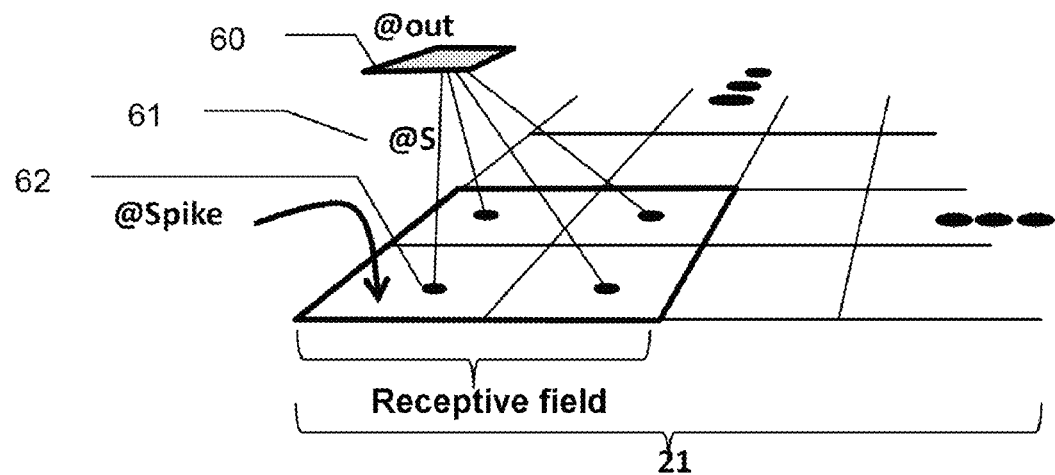
FIG. 6 shows an example of a connection of a neuron of a maximum pooling layer, for a receptive field of size 2*2 of an input matrix.

FIG. 6 shows an example of a connection of a neuron MP for a receptive field of size 2*2 of an input matrix 21.

Each maximum pooling layer comprises a set of neurons 60 called "maximum pooling" (Max Pooling) neurons or neurons MP. The neurons MP of a "MaxPooling" layer are connected at input to N synapses 61 numbered from 0 to N−1. The address of each synapse is denoted below by @S.

In response to the reception of a spike by a synapse of address @S, the maximum pooling computation device 10 is configured so as to determine whether the address of the activated synapse corresponds to at least one reference address @Smax, corresponding to the address of the most active synapse in the maximum pooling layer (@S=@Smax). If the condition is satisfied, the device 10 triggers the neuron MP connected to the synapse of address @S that received the input spike.

According to the embodiments of the invention, each address @Smax of the most active synapse (also called reference address) may be computed dynamically each time an input spike is received by a layer, in order to determine whether a neuron MP should be triggered.

Each neuron MP has a single output address denoted @out (neuron identifier), this address being used to identify it when it triggers. A neuron MP of a maximum pooling layer triggers upon reception of a spike on its most active synapse.

For a given neuron, the relationship between the address of the spike 62, denoted "@spike", and the address of the synapse (@s) activated by this spike depends on the receptive field of the neuron on the input map as illustrated in FIG. 6.

The address @spike corresponds to the address of the neuron of the preceding layer that emitted the spike, in other words to the address of the input neuron in the receptive field.

The embodiments of the invention make it possible to trigger a neuron MP and to determine the value of the neuron MP output spike by selecting the most active synapse of a receptive field of the neuron MP, without it being necessary to compute the output address of a triggered neuron @out or the relationship between the address of the spike @Spike and the address of the synapse @S.

Figure 7:
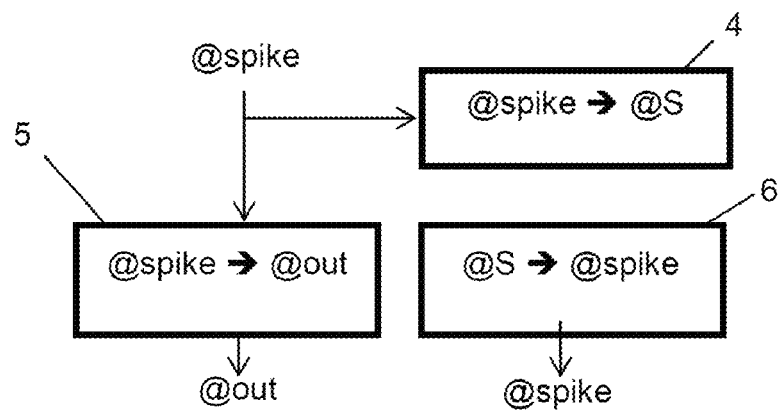
FIG. 7 shows a diagram illustrating the routing of an address input spike received in the receptive field of a neuron of a maximum pooling layer, according to some embodiments.

FIG. 7 shows a diagram illustrating the routing of an input spike of address "@spike" received in the receptive field of a neuron MP of address "@out" by activating a synapse of address "@S".

FIG. 7 shows 3 blocks, all of the blocks receiving an input spike of address @spike and delivering a triggered neuron of address @out and an output spike of address@spike:

@spike→@S: representing the synapse addresses @S that have received an input spike;

@S→@out: representing a neuron MP that has received an input spike that activated a synapse @S @S→@spike: representing an output spike of a triggered neuron MP that has received an input spike that activated a synapse @S.

The maximum pooling computation device 10 is configured so as to receive, one by one, the synapse addresses @S that have received a spike (block 4 denoted "@spike→@S").

In response to receiving a spike on a neuron MP, the device 10 is configured so as to determine at least one address of the most active synapse (also called "address of the maximum synapse" or "reference address") @Smax, while maintaining an internal variable D representing the "hardness" of the maximum synapse (called "hardness value" or "synapse activity indicator"). The hardness variable represents the differential activity (in terms of received spikes) of the synapse with respect to the other synapses.

If it is determined that the address of the activated synapse @S is equal to at least one reference address @Smax, the neuron MP is triggered and a spike signal is emitted at the output of the neuron.

For a fully connected (or FC) maximum pooling layer, block 4 denoted "@spike→@S" is not involved because the address of the spike is equal to the address of the synapse (@spike=@S). For the other types of maximum pooling layer connection, block 4 "@spike→@S" may be represented by the memory in which the synaptic weights are stored. In such an embodiment, it is advantageous for the synaptic weights not to be redundant and therefore for the synaptic accuracy to be sufficient ($2^{precision} \geq N$).

Block 5 "@spike→@out" provides the address @out of the output neuron in response to the input spike of address @spike. Block 5 "@spike→@out" may be dependent on the type of neural network.

Figure 8A:
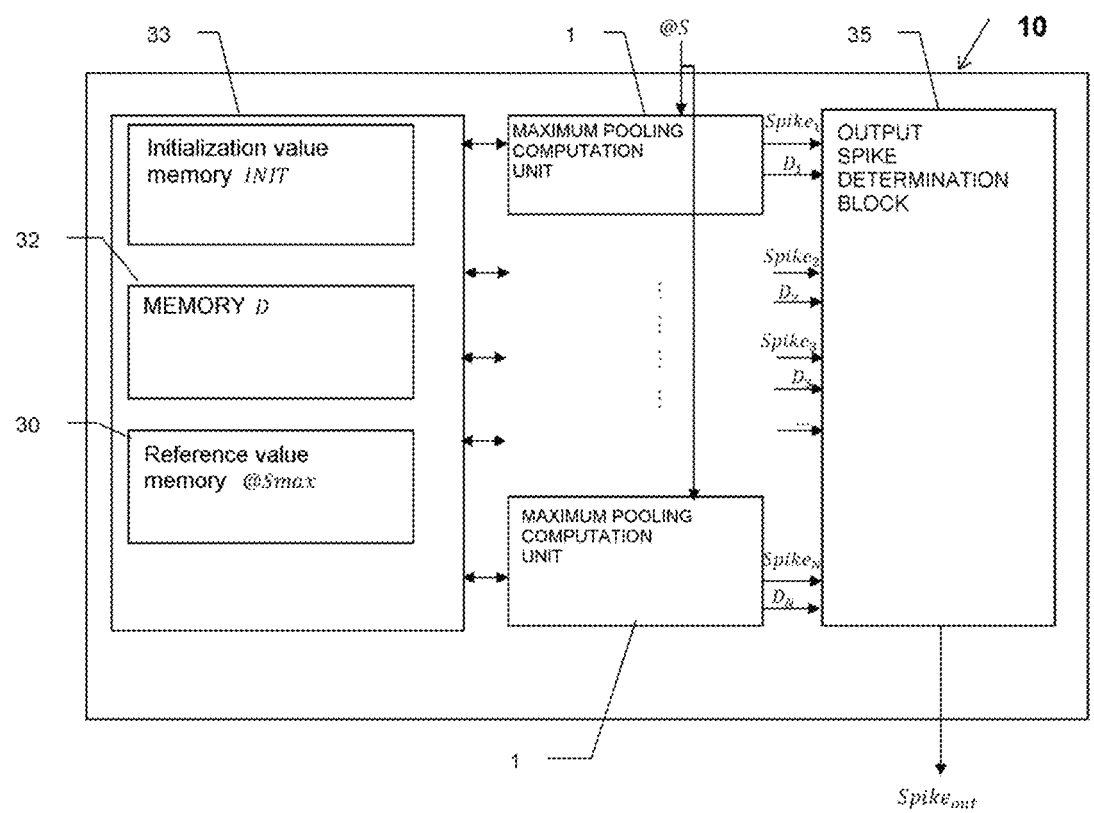
FIG. 8A shows the maximum pooling computation device, according to one embodiment.

FIG. 8A shows the maximum pooling computation device 10 according to one embodiment.

In response to receiving an input spike on a synapse of the receptive field of the neuron MP, the maximum pooling computation device 10 may be configured so as to determine whether the received synapse address @S corresponds to at least one stored reference address @Smax. Each reference address @Smax$_i$ is associated with a hardness value D$_i$. If it is determined that the address of the activated synapse @S is equal to one of the addresses of the set of reference addresses @Smax$_k$, and the hardness value D$_k$ associated with this reference address @Smax$_k$ has the largest value from among the values of the hardness counters associated with the other reference addresses of the set, the device triggers the neuron MP by emitting an output spike Spike$_{out}$.

In one embodiment, a set of P reference addresses @Smax$_i$ may be stored in the various memories 31 (that is to say N memories 31), the set comprising at least two reference addresses (P>1). Advantageously, P is between 1 and N−1, N denoting the number of synapses. Each reference address @Smax$_i$ is associated with a hardness counter D$_i$ and with a maximum pooling layer neuron MP$_i$. In such an embodiment:

the memories 30 may be represented by a data structure such as a table @Smax[ ] (also called "reference address table") for storing the P reference addresses @Smax$_i$=@Smax[i], each entry of the table associated with an index i providing the ith reference address @Smax$_i$, the counters 32 may be represented by a data structure such as a table (also called "hardness table") for storing the P hardness counters D$_i$, each entry of the hardness table D[ ] associated with an index i providing the ith reference address @Smax$_i$, the ith hardness value D$_1$=D[i] being associated with the ith reference address @Smax$_i$;

the memories 33 may be represented by a data structure such as a table (also called "initialization table") for storing N initialization values INIT$_i$, each entry of the initialization table INIT[ ] associated with an index i providing the ith reference address INIT$_i$=INIT[i], the ith initialization value INIT$_i$ being associated with the ith reference address @Smax$_i$ and with the ith hardness counter D$_i$.

In such an embodiment, an output spike may be determined for each reference address @Smax$_i$. A data structure such as a table (also called "output spike table") may be used to store the N output spike values Spike$_i$, each entry of the output spike table associated with an index i providing the ith output spike value Spike$_i$=Spike[i], the ith output spike value being associated with the ith reference address @Smax$_i$ and with the ith hardness counter D$_i$.

According to the embodiments of the invention, the maximum pooling computation device 10 may comprise:

at least one memory 30 configured so as to store at least one reference address @Smax$_k$ of the currently most active synapse.

a memory 32 associated with the memory 30 for storing a "hardness" value D$_k$ in association with each reference address @Smax$_k$; the memory 32 represents the integration of the neuron;

a memory INIT$_k$ 33 configured so as to store the initialization value of each "hardness" value D$_k$, the initialization value being assigned to the hardness value D$_k$ when the reference address @Smax$_k$ is modified.

at least one maximum pooling unit 1 configured so as to determine an elementary output spike of a neuron MP at an input spike.

an output spike determination block 35 configured so as to determine the output spike of the neuron Spike$_{out}$ on the basis of the elementary output spikes.

In some embodiments, the device 10 may comprise a maximum pooling unit 1 associated with each pair, comprising a reference address @Smax$_k$ and the associated hardness value D$_k$. As a variant, a single maximum pooling unit 1 may be used. The remainder of the description will be given with reference to a single maximum pooling unit 1 associated with each pair, comprising a reference address @Smax$_k$ and the associated hardness value D$_k$.

Figure 8B:
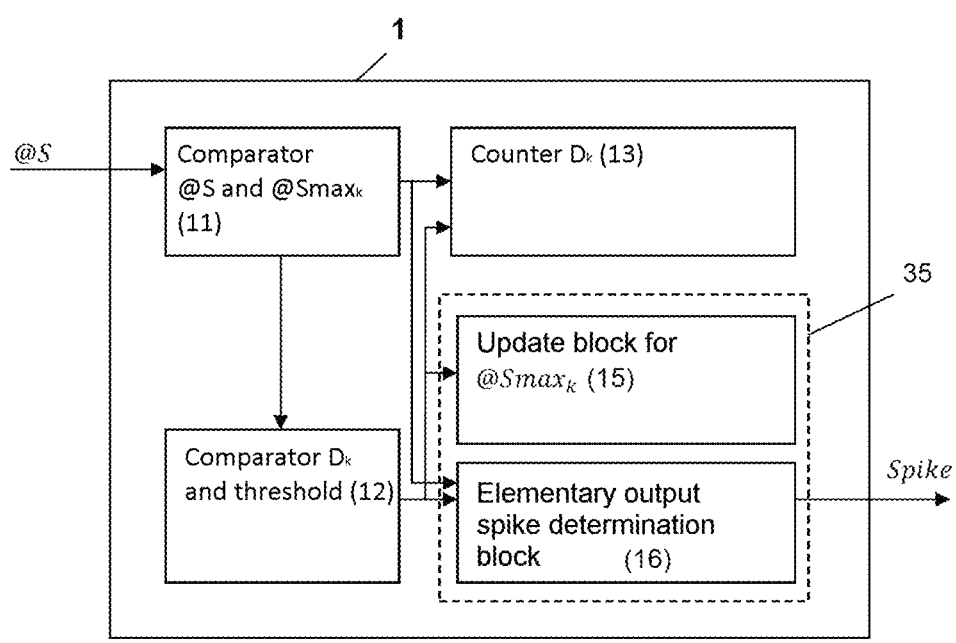
FIG. 8B is a schematic depiction of each maximum pooling unit, according to one embodiment.

With reference to FIG. 8B, each maximum pooling unit 1 may comprise:

an address comparator 11 configured so as to compare the reference address @Smax$_k$ with the address @S of the activated synapse;

a hardness value comparator 12 configured so as to compare the associated hardness value D$_i$ with a predefined threshold S;

a counter 13 configured so as to update the hardness value on the basis of the comparison results returned by the comparators 11 and 12;

a reference address update block 15 configured so as to set a reference address @Smax$_k$ to the address @S of the activated synapse on the basis of the results of the comparisons of the comparators 11 and 12;

an elementary output spike determination block 16 configured so as to determine an elementary output spike value for the pair {@Smax$_k$, D$_k$}.

In one preferred embodiment, the threshold S used by the hardness value comparator 12 to compare the hardness value D$_i$ with this threshold has a value equal to zero (S=0). The remainder of the description will be given with reference to a comparison threshold S set to 0 for the comparison of the hardness values, by way of non-limiting example.

The counter 13 makes it possible to measure the differential activity between the synapse that is currently the most active and the other synapses.

The internal value of the neuron MP (also called "integration of the neuron"), represented by the memory 32 storing the hardness values $D_k$, may be incremented by a chosen increment value a if the address of the activated synapse @S corresponds to one of the stored reference addresses @Smax, or decremented by a chosen decrementation value b if the address of the activated synapse @S does not correspond to any of the stored reference addresses @Smax, or set to an initialization value INIT on the basis of the results of the comparisons performed by the comparators 11 and 12.

The value b represents a "penalty" value, whereas the value a represents a "reward" value. The values a and b may be identical or different. In one embodiment, the values a and/or b represent an integer value. When the maximum pooling device comprises several reference address/hardness value pairs, the values a and b that are applied in order to update the counters 32 may be different from one counter 13 to the other.

When the penalty/benefit values a and b that are applied to the hardness counters are different for all of the hardness value $D_i$ counters 13, the device 10 may comprise a memory storing the penalty/benefit values in the form of a data structure, such as a table, each entry of the initialization table associated with an index i storing an ième pair $\{a_i, b_i\}$ comprising the penalty value $b_i$ and the reward value $a_i$ associated with the ième hardness counter $D_i$.

When a hardness value $D_1$ in the memory 32 reaches the value zero, the reference address update block 15 may be configured so as to replace the associated reference address @Smax with the address of the activated synapse @S and to set the hardness value D of the associated counter 13 (integration of the neuron) to the size of the kernel of the pooling layer.

In one exemplary embodiment, the penalty and reward values a and b may be equal to 1, whereas the initialization value INIT of the hardness may be equal to the number of synapses P.

The output spike determination block 35 may be configured so as to determine the output spike of the neuron Spike$_{out}$ at the value of the output spike corresponding to the address '@ max($D_k$)' corresponding to the maximum hardness value $D_k$, that is to say Spike$_{out}$=Spike [@ max($D_k$)].

In some embodiments, some or all of the reference address memories 32, hardness value memories 30 and initialization value memories 31 may be included in the memory of the computer 100 storing the internal value of a neuron MP.

Figure 9:
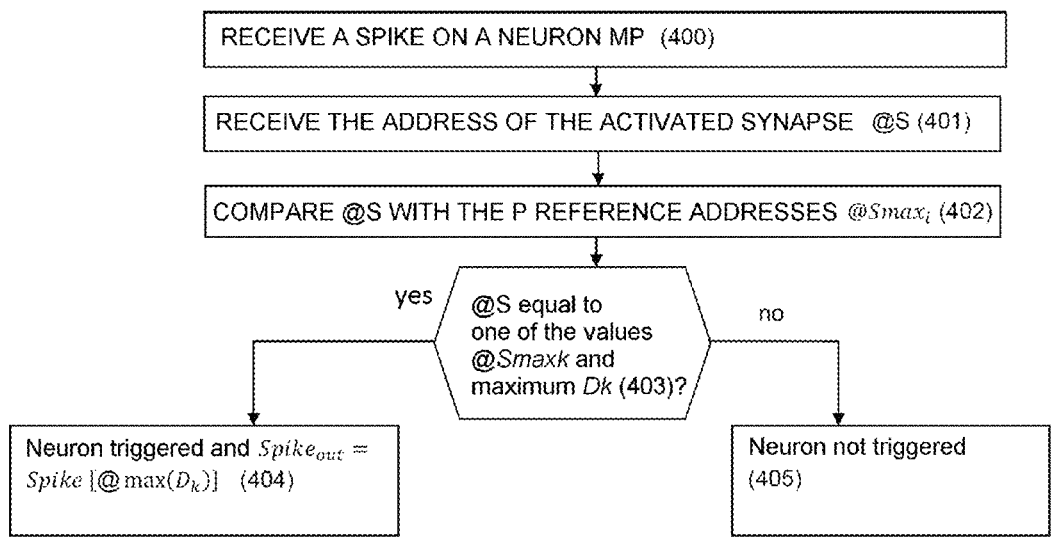
FIG. 9 illustrates the method for triggering maximum pooling neurons, in response to an input spike received by one or more neurons of a maximum pooling layer, according to some embodiments.

FIG. 9 illustrates the method for triggering neurons MP in response to an input spike received by one or more pooling neurons, according to some embodiments.

In response to an input spike received by a pooling neuron, the method for triggering a neuron MP activates or triggers the neuron MP if the address of the activated synapse @S is equal to one of the reference addresses @Smax$_i$ (also denoted @Smax[i] when the reference addresses are stored in a table @Smax[ ]) and when the hardness value $D_i$ (also denoted D[i] when the reference addresses are stored in a table D[ ]) associated with this reference address @Smax$_i$ has the largest value from among the hardness values associated with the other reference addresses of the set. If not, the neuron is not activated.

The method may generate a signal (output spike Spike$_{out}$) at the following convolution layer, in response to the triggering of the neuron MP.

More precisely, in step 400, the address of the synapse associated with the received input spike @S, called activated synapse address, is received.

In step 402, the address of the activated synapse @S is compared with the P addresses of the set of reference addresses @Smax$_i$, with P between 1 and N−1, each reference address @Smax$_i$ being associated with a hardness value $D_i$, and with a pooling neuron.

If the address of the activated synapse @S is equal to one of the P addresses of the set of reference addresses @Smax$_k$, and the hardness value $D_k$ associated with this reference address @Smax$_k$ has the highest value from among the hardness values $D_k$ associated with the other reference addresses of the set (block 403), the associated neuron MP is triggered and the output spike Spike$_{out}$ is set to the value of the output spike corresponding to the address '@ max ($D_k$)' of the counter $D_k$ in step 404, that is to say Spike$_{out}$=Spike [@max($D_k$)].

If the condition of step 404 is not satisfied, the neuron is not activated (step 405). In this case, the hardness values $D_i$ and the hardness values @Smax$_i$ may be updated on the basis of the comparison of each hardness value $D_i$ with respect to zero ('0').

In some embodiments, the hardness value $D_i$ associated with reference addresses @Smax$_i$ of the reference set may be decremented by a decrementation value $b_k$ if the address of the activated synapse @S is different from the reference address @Smax$_i$ and the hardness value $D_i$ is less than or equal to zero.

If the address of the activated synapse @S is different from the reference address @Smax$_i$ and the hardness value $D_i$ is strictly greater than zero, the reference address @Smax$_i$ may be set to the value of the activated synapse @S (@Smax$_i$=@S), whereas the hardness $D_i$ value $D_i$ associated with the reference addresses @Smax$_i$ of the reference set may be set to the associated initialization value INIT$_i$ ($D_i$=INIT$_i$).

In one embodiment, step 404 may furthermore comprise incrementing the hardness value $D_k$ associated with the reference address @Smax$_k$ that has the largest value from among the hardness values, the hardness value being incremented by a value $a_k$.

Figure 10:
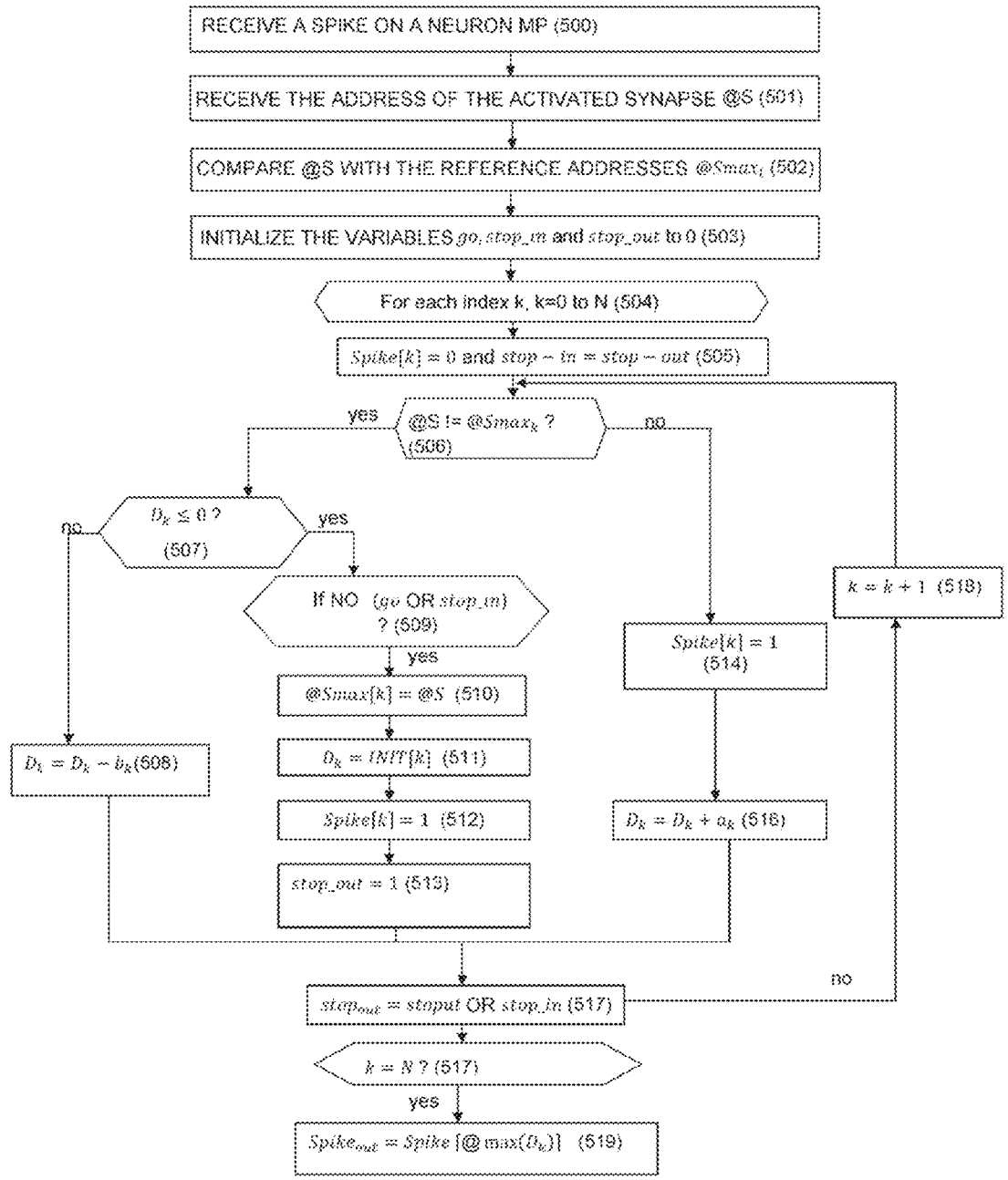
FIG. 10 is a flowchart describing an exemplary implementation of the method for triggering a neuron of a maximum pooling layer, according to one embodiment.

FIG. 10 is a flowchart describing an exemplary implementation of the method for triggering a neuron MP of a maximum pooling layer, according to one embodiment.

In step 500, a spike is received on a neuron MP.

In step 501, the address of the synapse @S associated with the input spike (address of the activated synapse) is received.

In step 502, the address of the activated synapse @S is compared with the set of reference addresses @Smax$_i$.

In step 503, Boolean parameters go, stop_in and stop_out are initialized at zero. The parameter go, called "general activation parameter", takes the value one ('1') if the address of the activated synapse is already contained in the reference address table Smax[ ], and the value zero ('0') if not. The parameters stop_in and stop_out represent control parameters, also called "stop parameter", associated with each trigger unit 1 and able to stop or block the operation of an adjacent trigger unit 1 on the basis of the value of these parameters. The parameter stop_in is a stop input parameter and the parameter stop_out is a stop output parameter.

Such parameters prevent two trigger units 1 from having the same reference address value @Smax. Thus, if one of the trigger units 1 changes its reference address value @Smax, it prevents all of the other units 1 situated to its right from changing the value of their associated reference address @Smax by setting the parameter stop_out to the value 1 (stop_out=1). Saving the reference addresses @Smax is therefore a priority: in the example of the figures, the further to the left in the circuit a trigger unit is situated, the greater a priority it is to change its associated reference address @Smax.

For each index k ranging from 1 to P (block 504), the output value of the spike is initialized at zero ('0') and the parameter stop_in is set to the value of the parameter stop_out in step 505.

In step 506, it is determined whether the address of the activated synapse @S is different from a reference address @Smax$_i$ of the set of reference addresses.

If it is determined that the address of the activated synapse @S is different from the reference addresses @Smax$_i$ of the set of reference addresses (block 506), it is determined in step 507 whether one of the reference addresses @Smax$_i$ is associated with a hardness counter D$_i$ having a value less than or equal to zero (D$_k$≤0).

For each reference address @Smax$_k$, associated with a hardness counter D$_k$ having a value less than or equal to zero (D$_k$≤0), the reference address @Smax$_k$ is set to the address of the activated synapse @S, associated with the hardness counter D$_k$, if the address of the activated synapse is not already stored in the memories 31, as checked in step 509 (for example in the table @Smax[ ]): @Smax[k]=@S). In such a case, the activated synapse address @S has not already been recorded (go=0) by a trigger unit 1 and is not currently being recorded by a trigger unit 1 situated further to the left (stop_in =0). It may therefore be recorded by a trigger unit 1 as the reference address @Smax associated with this unit 1, if its associated hardness value D is less than or equal to 0.

In step 511, the hardness value D$_k$ associated with the reference address @Smax$_k$ is set to the predefined initialization value INIT[k].

In step 512, the value of the output spike is set to one ('1') for the index k under consideration, that is to say Spike[k]=1.

In step 513, the stop-out parameter is set to one (stop_out=1).

If it is determined in step 507 that the reference address @Smax$_i$ is associated with a hardness counter D$_k$ having a value strictly greater than zero (D$_k$>0), in step 508, the hardness value D$_k$ is decreased by a chosen decrementation value b$_k$.

If it is determined in step 506 that the address of the activated synapse @S is equal to the reference address @Smax$_k$, the value of the output spike is set to one ('1') for the index k under consideration, that is to say Spike[k]=1 in step 515.

In step 516, the hardness value D$_k$ associated with the reference address is then incremented by an incrementation value a$_k$.

In step 517, the Boolean parameter stop_out is set to the value 'stop_out OR stop_in', in other words:
- stop$_{out}$=0 if the current value of stop_out is equal to zero ('0') AND the current value of stop_in' is equal to zero ('0');
- stop$_{out}$=1 if not.

Steps 506 to 517 are reiterated for all of the indices k (steps 518 and 519).

When all of the reference addresses have been compared (if k=N in step 518), the neuron is triggered if the parameter stopout is equal to one ('1'), the value of the output spike Spike$_{out}$=Spike[@ max(D [ ])] being the spike value associated with the address @max(D [ ]) corresponding to the counter D$_i$ having the maximum value D$_i$= max$_{k=1\ to\ P}$(D$_k$)=max(D [ ]). The address @max(D [ ]) is of size log 2 (N) bits.

In one particular embodiment, a single reference address @Smax associated with a hardness counter D and with a neuron MP is used.

Figure 11:
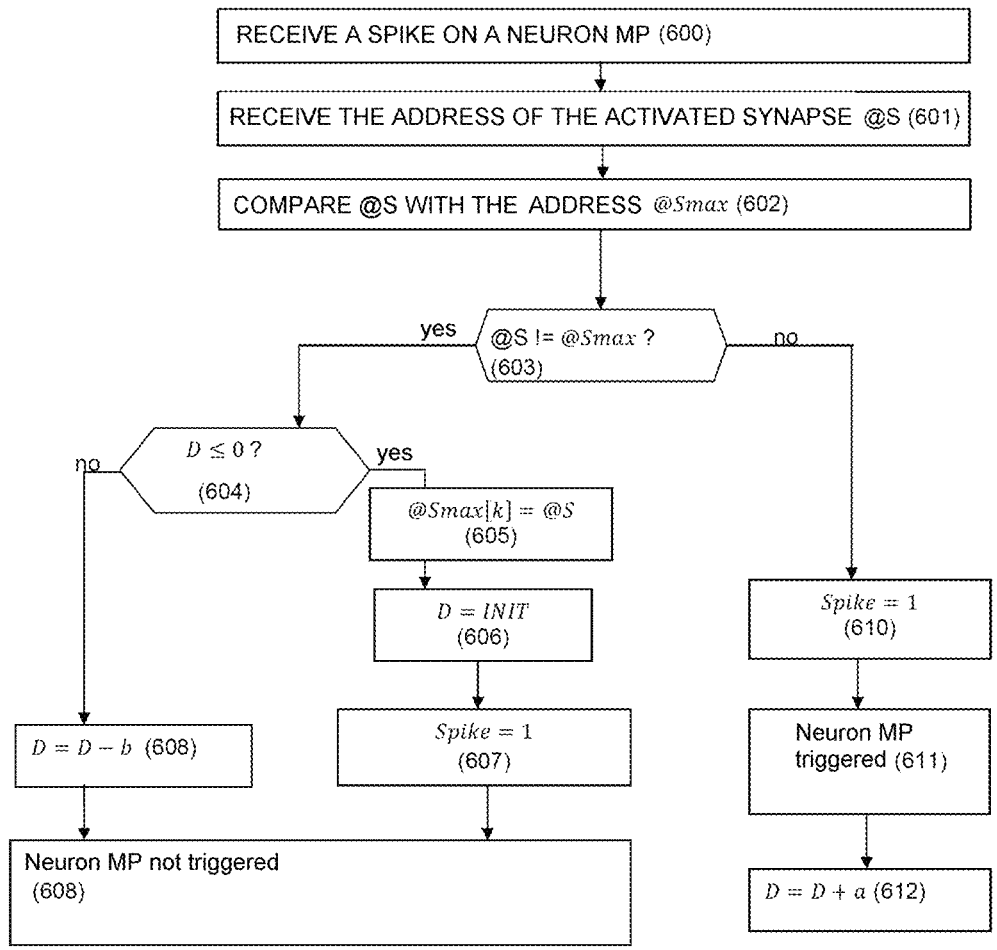
FIG. 11 is a flowchart showing the method for triggering a neuron of a maximum pooling layer, according to such an embodiment using a single reference address associated with a hardness counter and with a neuron of a maximum pooling layer.

FIG. 11 is a flowchart showing the method for triggering a neuron MP of a maximum pooling layer ("Max Pooling"), according to such an embodiment using a single reference address @Smax associated with a hardness counter D and with a neuron MP.

In step 600, a spike is received on a neuron MP.

In step 601, the address of the synapse @S associated with the input spike (address of the activated synapse) is received.

In step 602, it is determined whether the value of the received input spike ("spike") is equal to 0 (spike=0).

If the value of the received input spike ("spike") is equal to 0, it is determined in step 603 whether the address @S of the synapse activated by the input spike is different from the maximum synapse address @Smax stored in memory.

If the address @S of the synapse activated by the input spike is different from the maximum synapse address @Smax stored in memory ((@S!=@Smax), in step 604, it is determined whether the current value of the counter D is less than or equal to 0 (D≤0). D is of size C (in bits)

If the current value of the counter D is less than or equal to 0 (D≤0), in step 605, the address @Smax stored in memory is set to the value of the address of the activated synapse @S ((@Smax=@S).

Moreover, in step 606, the hardness D is initialized at the predefined initialization value INIT.

In step 607, the value of the output spike Spike is set to one ('1'), that is to say Spike=1. The neuron is not triggered (block 608).

If it is determined in step 604 that the current value of the counter D is strictly greater than 0 (D>0), the hardness value D is decremented by the value b in step 609. The neuron is not triggered (block 608).

If it is determined in step 603 that the address @S of the activated synapse is equal to the reference address @Smax (@S=@Smax), in step 610, the value of the spike "spike" at the output of the neuron MP is then set to 1 (spike=1) and the neuron MP is triggered (block 611). In step 612, the current value of the counter D is incremented by the value a.

The method for triggering the neurons of a maximum pooling layer (MAX–Pooling) may be implemented in the form of software and/or hardware, and in particular in the form of a digital or analog circuit.

Although the flowcharts of FIGS. 9 to 11 show successive steps, a person skilled in the art will readily understand that at least some of the steps in these figures may alternatively be executed in parallel or in a different order.

Figure 12:
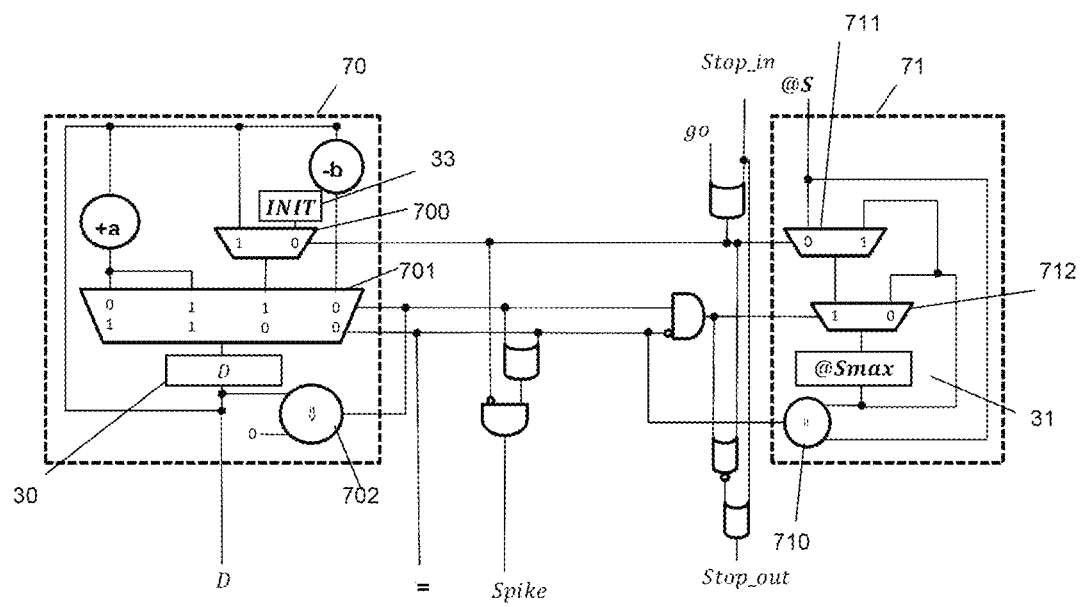
FIG. 12 shows the device for triggering a neuron of a maximal pooling layer in the form of a digital circuit comprising a maximum pooling computation unit, according to one embodiment.

FIG. 12 shows the device for triggering a neuron of a maximum pooling layer (MAX-pooling) 10 in the form of a digital circuit, according to one exemplary embodiment with P=1 (a single maximum pooling computation unit).

The circuit comprises the reference address memory 30, the memory storing the hardness value 32 and the memory storing the initialization value 33.

The circuit 10 comprises a counter block 70 configured so as to select the penalty value −b, reward value +a, or the initialization value INIT and update the hardness value D on the basis of the comparison between the activated synapse address @S and the reference address @Smax and the sign of the hardness value D.

The block 70 comprises a multiplexer 700 initializing the hardness value D and a multiplexer 701 configured so as to increment or decrement the hardness value D. The block 70 furthermore comprises a comparator 702 for comparing the hardness value D with zero.

The comparison between the activated synapse address @S and the reference address @Smax is performed using a comparator block 71 comprising a comparator 710. The results of the comparator block 71 make it possible to activate the counter block 70 in order to update the hardness D.

AND and OR logic gates (between blocks 70 and 71) make it possible to update the output spike (spike), the signal stop_out on the basis of the results of the comparisons performed by blocks 70, 71, the input signals go and/or stop_in.

Figure 13:
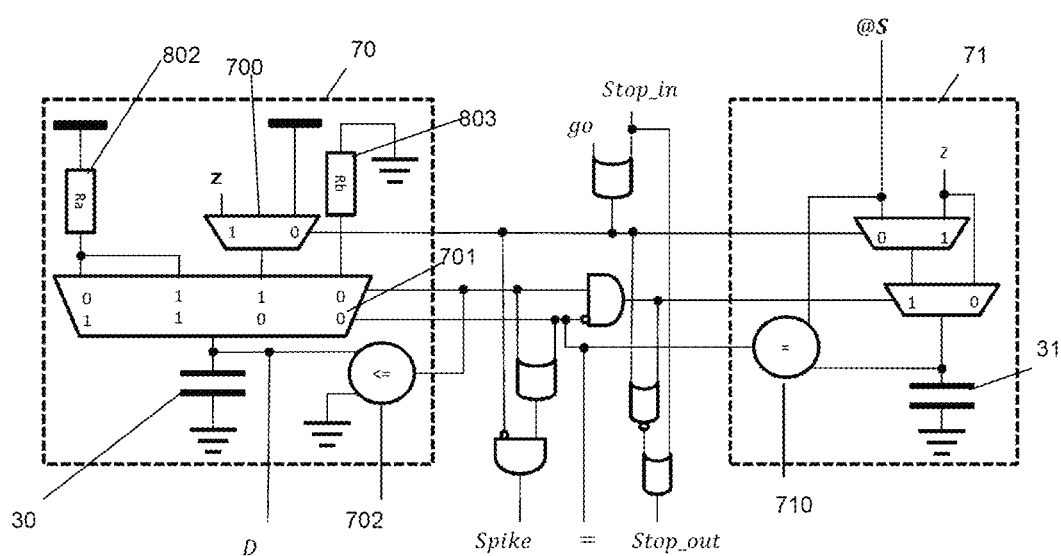
FIG. 13 is an analog circuit showing one exemplary implementation of the method for triggering a neuron of a maximum pooling layer, according to another embodiment.

FIG. 13 is an analog circuit showing one exemplary implementation of the method for triggering a neuron of a maximum pooling layer (MAX-Pooling) according to another embodiment.

FIG. 13 is functionally similar to FIG. 12, with a hardness value test and update block 70 and a comparison block 71 for comparing the activated synapse address @S and the reference address @Smax. However, in FIG. 13, these blocks are implemented in analog form (analog signals). In particular, the penalty/benefit values a and b are implemented using resistors 802 and 803, whereas the memories 30, 31 storing @Smax, D are implemented by capacitors.

FIG. 14 shows the lookup table corresponding to the various signals of the digital circuit of FIG. 12:
  'stop-in': representing a stop input parameter;
  Go: representing a general activation parameter;
  "<=": representing the hardness value comparator;
  "spike": representing the value of the input or output spike of the neuron;
  "+": representing the adder for the reward value a;
  "−": representing the subtractor for the penalty value b;
  'INIT' representing the initialization value;
  'New@S' representing a new activated synapse;
  'stop_out': representing a stop output parameter.

Figure 15:
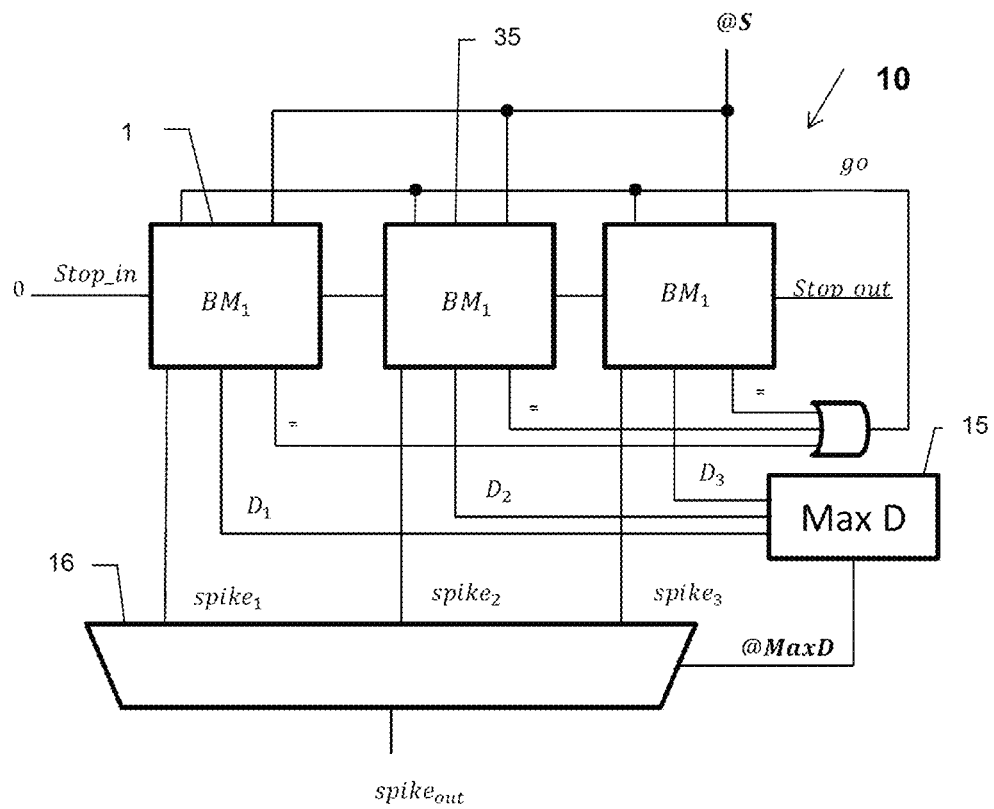
FIG. 15 is a depiction, in the form of a digital circuit, of the device for triggering neurons of a maximum pooling layer comprising 3 units for triggering neurons.

FIG. 15 is a depiction, in the form of a digital circuit, of the device 10 for triggering maximum pooling neurons MP, according to one embodiment. The device 10 comprises P maximum pooling units 1, each associated with a reference address @$Smax_k$, a hardness value $D_k$ and with an initialization value $INIT_k$. In the example of FIG. 15, P=3 maximum pooling units 1 are used (also denoted $BM_1$, $BM_2$, $BM_3$). Each unit $BM_i$ is associated with a reference address @$Smax_i$ (@$Smax_1$, @$Smax_2$, @$Smax_2$), and may be configured so as to compute the output spikes $Spike_i$ and update the hardness values $D_i$ ($D_1$, $D_2$, $D_3$), on the basis of the result of comparing the address of the activated synapse @S with the associated reference address @$Smax_i$ and/or the result of the comparison of the current value of the hardness value $D_i$ with the predefined threshold S as described above.

In response to receiving an input spike on a synapse of the receptive field of the neuron MP, each maximum pooling computation unit 1 thus receives the address of the activated synapse @S at input. Each maximum pooling computation unit 1 furthermore receives the control parameters stop_in and go described above at input.

Each maximum pooling computation unit 1 delivers an output spike value $Spike_i$=Spike[i] and the control parameter stop_out described above.

The device 10 comprises the maximization block 15, denoted "Max D", configured so as to determine the hardness value $D_i$ from among all of the hardness values stored in memory that has the maximum value, and determine the address of this hardness value @MaxD=$D_i$.

The device 10 also comprises a multiplexer 16 implementing the output spike computation block, controlled by the control signal @MaxD that is configured so as to select the value of the output spike Spike[@MaxD] that corresponds to the address @MaxD from among the P spike values that are delivered at output by the P maximum pooling units.

The hardness values $D_i$ are used by the output spike computation block 16 to select the output spike to be considered $Spike_{out}$, that is to say the spike corresponding to the address of the maximum hardness value from among the hardness values $D_1$, $D_2$, $D_3$ as determined by the maximum hardness value address computation block 15, denoted "Max_D".

Figure 16:
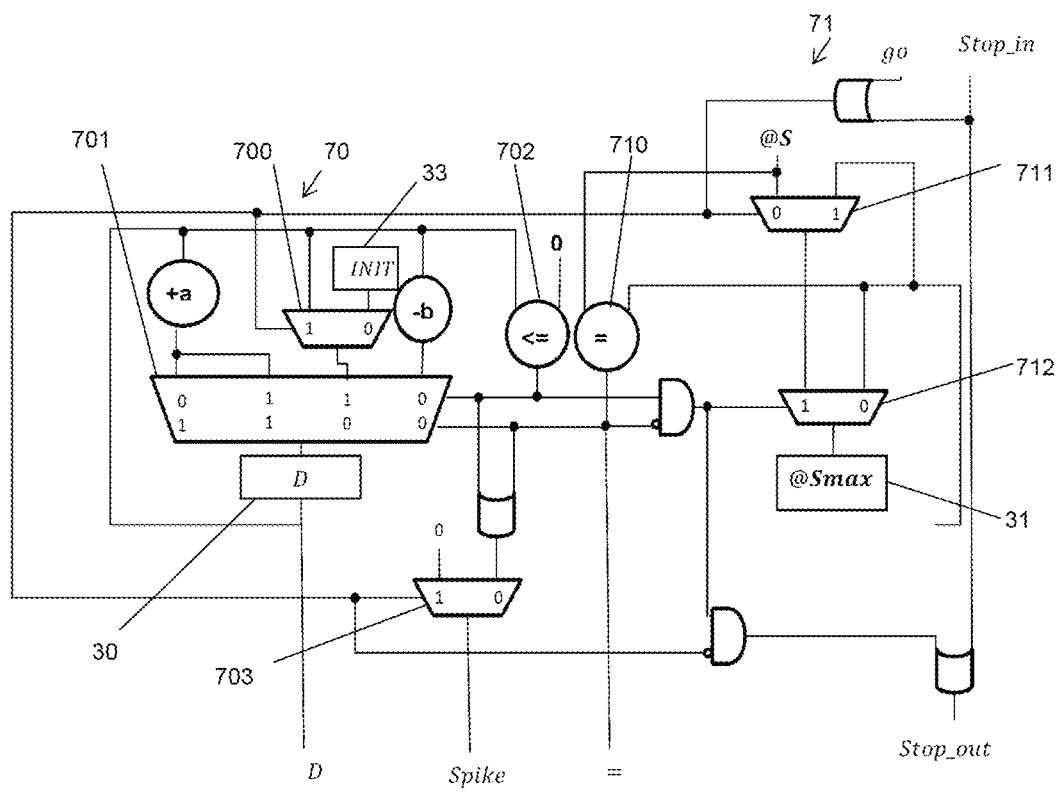
FIG. 16 is a depiction, in the form of a digital circuit, of a unit for triggering a neuron of a maximum pooling layer.

FIG. 16 is a depiction, in the form of a digital circuit, of a unit 1 for triggering a neuron MP, denoted BM. The unit BM is configured so as to determine the address @SMax, the input and output stop parameters stop_in and stop_out and the general activation input go that make it possible to prevent two different blocks BM from storing the same address @Smax.

The embodiments of the invention thus propose a novel maximum pooling neuron model for computing, through approximation, the response of a neuron of a maximum pooling layer to an input spike.

Based on an incremental/decremental counter 32 and a memory 31 for storing the value of the most active synapse @Smax, the embodiments of the invention make it possible to compute the response of a neuron of a maximum pooling layer to an input spike with an optimized number of hardware resources, compatible with the resources conventionally allocated to a neuron IF, while at the same time maintaining good performance. While conventional solutions require N*C bits in memory, the proposed embodiments require only log 2 (N)+C bits (N denoting the number of synapses and therefore the number of elements of the pool and C denotes the accuracy of the activity counter in bits). Only 2 comparison operations per stimulus are useful for each stored reference value (comparison of @S and @Smax and comparison of D with zero).

A person skilled in the art will understand that the computer 100 and in particular the device 10 for triggering the neurons of each maximum pooling layer according to the embodiments may be implemented in various ways by means of hardware, software, or a combination of hardware and software, notably in the form of program code that may be distributed in the form of a program product, in various forms. In particular, the program code may be distributed using computer-readable media, which may include computer-readable storage media and communication media. The methods described in the present description may notably be implemented in the form of computer program instructions able to be executed by one or more processors in an information technology computer device. These computer program instructions may also be stored in a computer-readable medium.

Moreover, the invention is not limited to the embodiments described above by way of non-limiting example. It encompasses all of the variant embodiments that may be contemplated by a person skilled in the art.

The invention claimed is:

1. A computer based on a spiking neural network, the network comprising layers of neurons, the inputs and outputs of each neuron being coded by spikes, the input spikes being received in sequence at the input of a neuron, each neuron of the network comprising a receptive field comprising at least one synapse, each synapse being associated with a synapse address, the computer being configured so as to compute, for each layer of neurons, the output value of each neuron in response to at least one input spike, the network furthermore comprising at least one maximum pooling layer, each pooling layer comprising maximum pooling neurons, each maximum pooling neuron being able to deliver an output spike in response to the reception of an input spike on the most active synapse of its receptive field, wherein the computer comprises a device for activating the neurons of the maximum pooling layer and in that, in response to an input spike received by a neuron of the maximum pooling layer, the device is configured so as to receive the address of the synapse associated with said received input spike, called activated synapse address, the device comprising an address comparator configured so as to compare the address of the activated synapse with a set of reference addresses, comprising at least one reference address, each reference address being associated with a hardness value and with a pooling neuron;

the device being configured so as to activate a neuron of the maximum pooling layer if the address of the activated synapse is equal to one of the reference addresses, and the hardness value associated with this reference address has the highest value from among the hardness values associated with the other reference addresses of said set.

2. The computer as claimed in claim 1, wherein the device comprises a counter configured so as to increment the hardness value associated with a reference address of said set of reference addresses by a chosen incrementation value, if said reference address is equal to said activated synapse address, the device furthermore being configured so as to deliver an output spike value set to the value 1, in association with said reference address.

3. The computer as claimed in claim 2, wherein the device comprises a hardness value comparator for comparing the hardness value with zero, and in that the counter is configured so as to decrement the hardness value associated with a reference address by a chosen decrementation value, if said reference address of said set of reference addresses is different from said activated synapse address and if the hardness value comparator indicates that the hardness value is strictly greater than zero.

4. The computer as claimed in claim 1, wherein the device is configured so as to set a reference address to the value of said activated synapse address, if said reference address is different from said activated synapse address and if the hardness value is less than or equal to zero, the device furthermore being configured so as to deliver an output spike value with the value 1 associated with said reference address and set the hardness value associated with the reference address to a predefined initialization value.

5. The computer as claimed in claim 2, wherein the device is configured so as to determine the address of the hardness value having the maximum value and to deliver, at the output of the neuron of the maximum activation layer, an output spike value corresponding to the value of the output spike associated with the reference address corresponding to said hardness value.

6. The computer as claimed in claim 1, wherein the device comprises at least one address memory for storing said reference addresses and at least one hardness value memory for storing the hardness values associated with each reference address, each reference address in the address memory being associated with a hardness value in the hardness value memory.

7. The computer as claimed in claim 4, wherein the device comprises at least one initialization value memory for storing at least one initialization value.

8. The computer as claimed in claim 7, wherein the device comprises a different initialization value for each reference address and in that said initialization value memory comprises a data structure, each input of the data structure being configured so as to store an initialization value associated with a reference address.

9. The computer as claimed in claim 1, wherein the computer is implemented in the form of a digital circuit.

10. The computer as claimed in claim 1, wherein the computer is implemented in the form of an analog circuit.

11. A method for computing the output values of neurons in a spiking neural network comprising at least one layer of neurons, in response to at least one input spike, the inputs and outputs of each neuron being coded by spikes, the input spikes being received in sequence at input by a neuron, each neuron of the network comprising a receptive field comprising at least one synapse, each synapse being associated with a synapse address, the neural network furthermore comprising at least one maximum pooling layer, each pooling layer comprising maximum pooling neurons, each maximum pooling neuron being able to deliver an output spike in response to the reception of an input spike on the most active synapse of its receptive field, wherein the method comprises a step of activating the neurons of the maximum pooling layer, and in that, in response to an input spike received by a neuron of the maximum pooling layer, said activation step comprises the steps of:

receiving the address of the synapse associated with said received input spike, called activated synapse address, comparing the address of the activated synapse with a set of reference addresses, comprising at least one reference address, each reference address being associated with a hardness value and with a pooling neuron;

activating a neuron of the maximum pooling layer if the address of the activated synapse is equal to one of the reference addresses and the hardness value associated with this reference address has the highest value from among the hardness values associated with the other reference addresses of said set.

12. The method as claimed in claim 11, wherein it comprises the steps of:

incrementing the hardness value associated with a reference address of said set of reference addresses by a chosen incrementation value, if said reference address is equal to said activated synapse address, and delivering an output spike value set to the value 1 for said maximum pooling neuron, in association with said reference address.

13. The method as claimed in claim 11, wherein the method comprises a step of comparing the hardness value with zero, and decrementing the hardness value associated with a reference address by a chosen decrementation value, if said reference address of said set of reference addresses is different from said activated synapse address and if the hardness value is strictly greater than zero.

14. The method as claimed in claim 11, wherein the method comprises the steps of:
   setting a reference address to the value of said activated synapse address, if said reference address is different from said activated synapse address and if the hardness value is less than or equal to zero,
   delivering an output spike value set to the value 1 in association with said reference address, and
   setting the hardness value associated with the reference address to a predefined initialization value.

15. The method as claimed in claim 12, wherein the method comprises the steps of:
   determining the address of the hardness value having the maximum value, and
   delivering, at the output of the neuron of the maximum pooling layer, an output spike value corresponding to the value of the output spike associated with the reference address corresponding to said hardness value.

* * * * *